United States Patent [19]

Willard et al.

[11] Patent Number: 5,325,088

[45] Date of Patent: Jun. 28, 1994

[54] SYNCHRONOUS SELECTIVE SIGNALLING SYSTEM

[75] Inventors: David F. Willard, Plantation; Robert J. Schwendeman, Pompano Beach; William J. Kuznicki; Morris A. Moore, both of Coral Springs; Michael J. DeLuca, Boca Raton, all of Fla.

[73] Assignee: Motorola, Inc., Schaumburg, Ill.

[21] Appl. No.: 801,574

[22] Filed: Dec. 2, 1991

[51] Int. Cl.⁵ ............................................. H04Q 7/00
[52] U.S. Cl. ........................ 340/825.2; 340/825.21; 340/825.44; 370/94.1
[58] Field of Search ................. 370/94.1, 60, 85.7, 370/95.1, 93, 95.3; 340/825.44, 825.2, 825.21; 455/38.3

[56] References Cited

U.S. PATENT DOCUMENTS

| 4,398,192 | 8/1983 | Moore et al. |
|---|---|---|
| 4,668,949 | 5/1987 | Akahori et al. |
| 4,860,003 | 8/1989 | DeLuca et al. |
| 4,860,004 | 8/1989 | Davis ............................ 340/825.44 |
| 4,897,835 | 1/1990 | Gaskill et al. |
| 5,010,330 | 4/1991 | Snowden et al. ............ 340/825.21 |
| 5,128,932 | 7/1992 | Li ............................................ 370/60 |

OTHER PUBLICATIONS

"Semi-Distributed Addressing, a New Concept for ERMES Radio Protocol" dated May 11, 1989 by an unknown author.

"Sub-addressing, a Battery Saving Method" dated Mar. 16, 1989 by an unknown author.

*Primary Examiner*—Donald J. Yusko
*Assistant Examiner*—E. Merz
*Attorney, Agent, or Firm*—Keith A. Chanroo; Michael J. DeLuca; Thomas G. Berry

[57] ABSTRACT

A selective call receiver (111) has a first mask (134A) stored within the selective call receiver (111) indicative of a first period of reception for receiving a transmitted communication signal (99) having a plurality of packets (100). Each of the transmitted packet (100) has message information (110). An identifier (106) identifies the packet (100). The control signal (108) is representative of a second mask (134B) indicative of a second period of reception. The second mask is compared with the first mask for determining the second period of reception of the selective call receiver (111). A correspondence between the first and second masks determines whether to change the first period of reception of the selective call receiver (111) for receiving at least one additional packet.

24 Claims, 17 Drawing Sheets

| FRAME # → | | | | | | | | |
|---|---|---|---|---|---|---|---|---|
| | 000 | 001 | 010 | 011 | 100 | 101 | 110 | 111 |
| 000 | 0 | 1 | 2 | 3 | 4 | 5 | 6 | 7 |
| 001 | 01 | 01 | 23 | 23 | 45 | 45 | 67 | 67 |
| 010 | 02 | 13 | 02 | 13 | 46 | 57 | 46 | 57 |
| 011 | 0123 | 0123 | 0123 | 0123 | 4567 | 4567 | 4567 | 4567 |
| 100 | 04 | 15 | 26 | 37 | 04 | 15 | 26 | 37 |
| 101 | 0145 | 0145 | 2367 | 2367 | 0145 | 0145 | 2367 | 2367 |
| 110 | 0246 | 1357 | 0246 | 1357 | 0246 | 1357 | 0246 | 1357 |
| 111 | 1-8 | 1-8 | 1-8 | 1-8 | 1-8 | 1-8 | 1-8 | 1-8 |

TRANSMITTED CYCLE ↑

SYNCHRONOUS SELECTIVE SIGNALLING SYSTEM

FIELD OF THE INVENTION

This invention relates in general to signalling systems, and more specifically to a signalling system for use in a selective call receiver system.

BACKGROUND OF THE INVENTION

Prior art selective call receiver systems (paging systems) have endeavored to efficiently communicate information to selective call receivers (pagers) while providing for effective battery saving operation of the selective call receivers. The widely accepted Golay Sequential Code (GSC) provides an asynchronous method for communicating message information to selective call receivers and has been described in U.S. Pat. Nos. 4,424,514 and 4,427,980 both issued to inventors Fennell, et al. The GSC protocol provides a preamble signal which initially synchronizes the selective call receivers to a paging signal. One of the several well known preamble signals may be used, each identifying a different group of selective call receivers which are used to decode following message information. Additionally, U.S. Pat. No. 4,860,003 issued to DeLuca, et al. describes power conservation during the reception of a signal, such as the GSC signal, in response to a signal indicating the occurrence of address information.

An asynchronous/synchronous signalling system has been defined by the Post Office Standardization Code Advisory Group (POCSAG). The operation according to the POCSAG signalling system requires selective call receivers to synchronously decode the received signal subsequent to being synchronized to the POCSAG signal. The POCSAG signal and a method for decoding the signal is described in U.S. Pat. No. 4,663,623 issued to Lax, et al. Like GSC, a POCSAG transmission may begin asynchronously with respect to a prior POCSAG transmission, and once the transmission begins, the signal is synchronously decoded until the transmission ends. The POCSAG transmission has at least one batch, each batch beginning with a synchronization signal followed by eight frames, each frame occurring at a predetermined time after the synchronization signal. A selective call receiver synchronized to the signal needs to search for its address in only a predetermined one of the eight frames. In the remaining seven frames, the selective call receiver conserves power by one of the well known techniques of battery saving. However, subsequent transmissions, for example, the POCSAG signals, need not be either bit or frame synchronized to the previous POCSAG transmission. By permitting a subsequent transmission signal to be synchronized only with each transmission, and not by bit or frame synchronization, the subsequent transmission is asynchronously synchronized to the POCSAG signal.

Most paging protocol signals are designed to co-exist with other paging protocol signals. For example, a GSC transmission may be followed by a POCSAG transmission which may be followed by a 5-tone sequential transmission, etc. It is desirable to provide battery saving features for the selective call receiver during the absence of a signal being directed to the selective call receiver. This has typically been accomplished with a preamble signal preceding the message transmission. Both the GSC and POCSAG signals begin with a long preamble signal providing for selective call receiver synchronization before the message transmission and providing for battery saving in the absence thereof. The preamble signal although providing for battery saving and synchronization, decreases the overall system message throughput. During the time taken for a preamble transmission, no message information is being communicated to the selective call receivers, thereby decreasing throughput of the system.

Synchronous selective call receiver protocols eliminate any preamble signal, thereby enabling a more efficient battery savings. A synchronous paging signal is shown in U.S. Pat. No. 4,642,632 issued to Ohyagi, et al. This synchronous signal has selective call receivers divided into one of a plurality of group fields, each group field occurring at a predetermined period and having a predetermined maximum message information capacity. Since the synchronous signal is always being transmitted, no preamble signals are required, and a selective call receiver needs only decode paging information while its preassigned group is being transmitted. However, varying traffic demands (the amount of message information for a group of selective call receivers) may cause the amount of message information for one group of selective call receivers to exceed the maximum capacity of the group field while another group field has available capacity. This causes transmission of idle signals during one group field, while in another group field, numerous messages are being queued because its capacity is exceeded. The throughput of the overall system is decreased because selective overload patterns are generated from the varying traffic levels within different group fields.

Thus, what is needed is a selective call receiver system which selectively sacrifices battery saving improvements afforded by a synchronous paging signal to prevent or to reduce overload occurring within the selective call receiver system.

SUMMARY OF THE INVENTION

A selective call receiver has a first mask stored within the selective call receiver indicative of a first period of reception for receiving a transmitted communication signal having a plurality of packets. Each of the transmitted packets has a message information, and a control signal. An identifier means identifies the packet. The control signal is representative of a second mask indicative of a second period of reception. The second mask is compared with the first mask for determining the second period of reception of the selective call receiver. A correspondence between the first and second masks determines whether to change the first period of reception of the selective call receiver for receiving the at least one additional packet.

DESCRIPTION OF A PREFERRED EMBODIMENT

Figure 1:
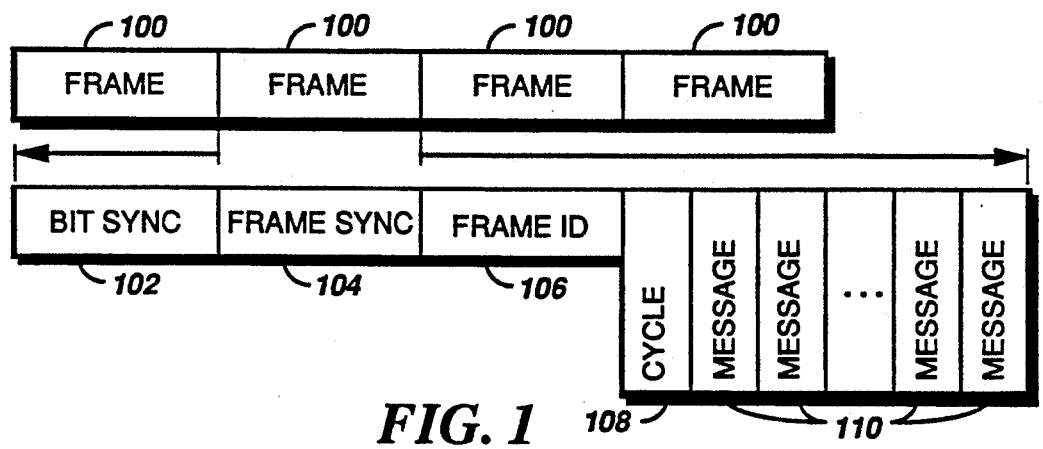
FIG. 1 illustrates a synchronous signal in accordance with the preferred embodiment of the present invention.

FIG. 1 shows a synchronous signal in accordance with the preferred embodiment of the present invention. The signal comprises of a number of message packets or frames 100. Each frame is preferably four seconds in duration and has a preferred base data rate of 1200 bits per second. Although, it will be appreciated that other data rates can be utilized as will be described below. Additionally, each frame comprises of a bit sync signal 102, preferably 32 bits of alternating 1,0 patterns, followed by a frame sync signal 104 preferably one of several predetermined thirty-two bit words, and a frame ID signal 106, preferably one thirty-two bit word having twenty-one variable information bits containing information such as a frame identification number. The bit sync signal 102 provides for selective call receiver bit synchronization while the frame sync signal 104 provides for frame synchronization and may include a signal indicative of the data rate of the message information following the frame ID signal 106. The frame ID signal 106 indicates the number of the frame. Each frame is numbered in a preferred sequence from 0 to 63 in a signalling system having sixty four frames. Alternately, any number of frames may be used in the system, however $2^N$ frames (where N is an integer) is preferred.

Following frame ID 106 is a word 108 having a cycle value and a plurality of message words 110 follow thereafter. Words 108–110 are, preferably, 31,21 BCH code words having twenty-one information bits and ten parity bits generated according to the well known BCH algorithm. An additional even parity bit extends the word to a 32,21 code word. Messages within words 110 comprise at least one message having an address signal and optional information signals associated with the address signal. Preferably, all of the address signals within the frame are located in a first portion and the information signals are located in a subsequent portion of the frame. It is well known to those skilled in the art how the locate addresses in a first portion and message information in a second portion of a frame. Additionally, U.S. patent application Ser. No. 07/396,189 to DeLuca et al., assigned to the assignee of the present invention shows an improved method of locating addresses as in a first portion and message information in a subsequent portion of a signal. DeLuca is hereby incorporated by reference herein. Word 108 includes the cycle value which forms the indicating frames in which a selective call receiver is to decode message information as will be discussed below. In a paging system having $2^N$ frames, the cycle value occupies an N bit word 108. The remaining bits may contain a boundary signal indicating a boundary between the address and information signals in words 110. Words 108–110 are shown in a vertical orientation to indicate that these words may be interleaved in order to improve the immunity of the transmission to burst errors. Preferably words 108–110 comprise 18 blocks of words wherein each block contains 8 interleaved words. In an alternate embodiment the interleaving may be modified or eliminated.

Figure 2:
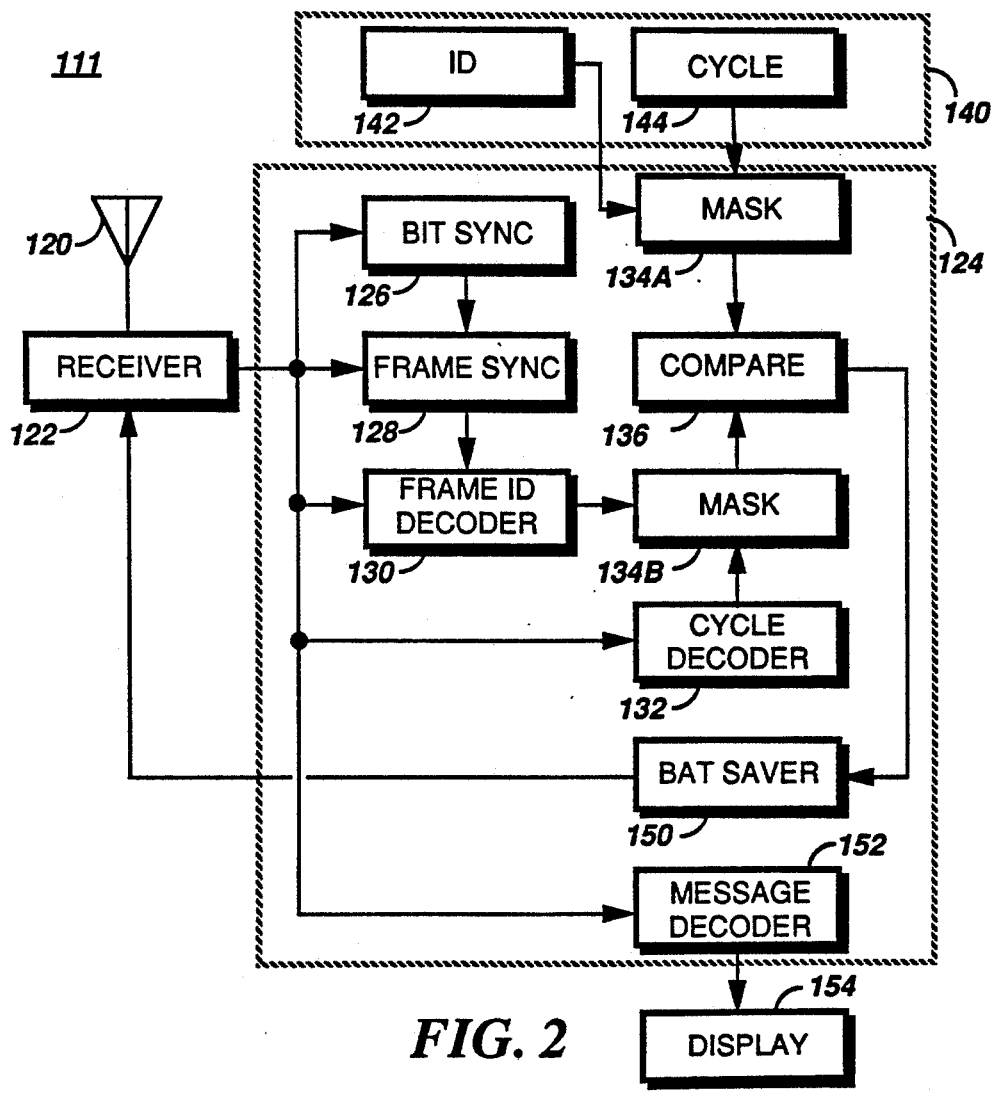
FIG. 2 is a block diagram of a battery operated selective call receiver operating in accordance with the preferred embodiment of the present invention.

FIG. 2 shows a battery operated selective call receiver operating in accordance with the preferred embodiment of the present invention. The radio frequency modulated signal of FIG. 1 is received by antenna 120, demodulated by receiver 122 and processed by decoder 124. Decoder 124 may be comprised within a microcomputer executing a program causing the selective call receiver to process the demodulated signal. A preferred microcomputer is the MC68HC05C8 microcomputer manufactured by Motorola, and a selective call receiver having a microcomputer decoder is described in the aforementioned U.S. Pat. No. 4,860,003 to DeLuca et al. which is hereby incorporated by reference herein. The decoder comprises a bit synchronizer 126 and a frame synchronizer 128 for synchronizing to signals 102 and 104, and respectively providing bit and word boundary signals for use by the remaining elements of the decoder 124. The decoder 124 preferably includes an identifier means for identifying the received frames or packets. Frame ID decoder 130 and cycle decoder 132 decode signals 106 and 108, respectively. The decoded signal 106 and 108 are masked by masking function 134B and compared by comparator 136 with information contained within a code plug 140. Code plug 140 has a predetermined frame ID 142, a predetermined cycle value 144, and a predetermined address assigned to the selective call receiver, as well as other signals which configure the selective call receiver for desired operating characteristics. As will be shown, the predetermined cycle value 144 allows one selective call receiver to be assigned to a plurality of frames. The predetermined frame ID 142 is masked with the predetermined cycle value 144 to generate a first mask value (at mask function 134A) indicative of a first period of reception of the selective call receiver and is used by comparator 136 to enable battery saver 150 to produce a first period of reception. Battery saver 150 deactivates receiver 122 for certain frames thereby conserving battery power. When the selective call receiver receives the information in words 108-110 message decoder 152 searches for an address signal matching a predetermined address signal assigned to the selective call receiver and further decodes information signals associated with the address. The message information may then be displayed on display 154.

In an alternate embodiment, the cycle value 108 may contain a signal indicative of the cycle to be used. The selective call receiver may include a plurality of predetermined cycle values, one of which is selected in response to the signal indicative of the cycle to be used. The table below shows a relationship between the received signal and the cycle value.

| SIGNAL | CYCLE |
| --- | --- |
| 000 | unused |
| 001 | 00 0000 |
| 010 | 10 0000 |
| 011 | 11 0000 |
| 100 | 11 1000 |
| 101 | 11 1100 |
| 110 | 11 1110 |
| 111 | 11 1111 |

In the table above, the system provides, for example, 6 bits for defining a cycle value, thereby providing for $2^6$ or, 64 frame IDs. Transmitting a signal indicative of the cycle to be used provides for communication of the cycle value with less information bits, thereby increasing the amount of information bits available for other information which may be included in word 108.

Figure 3:
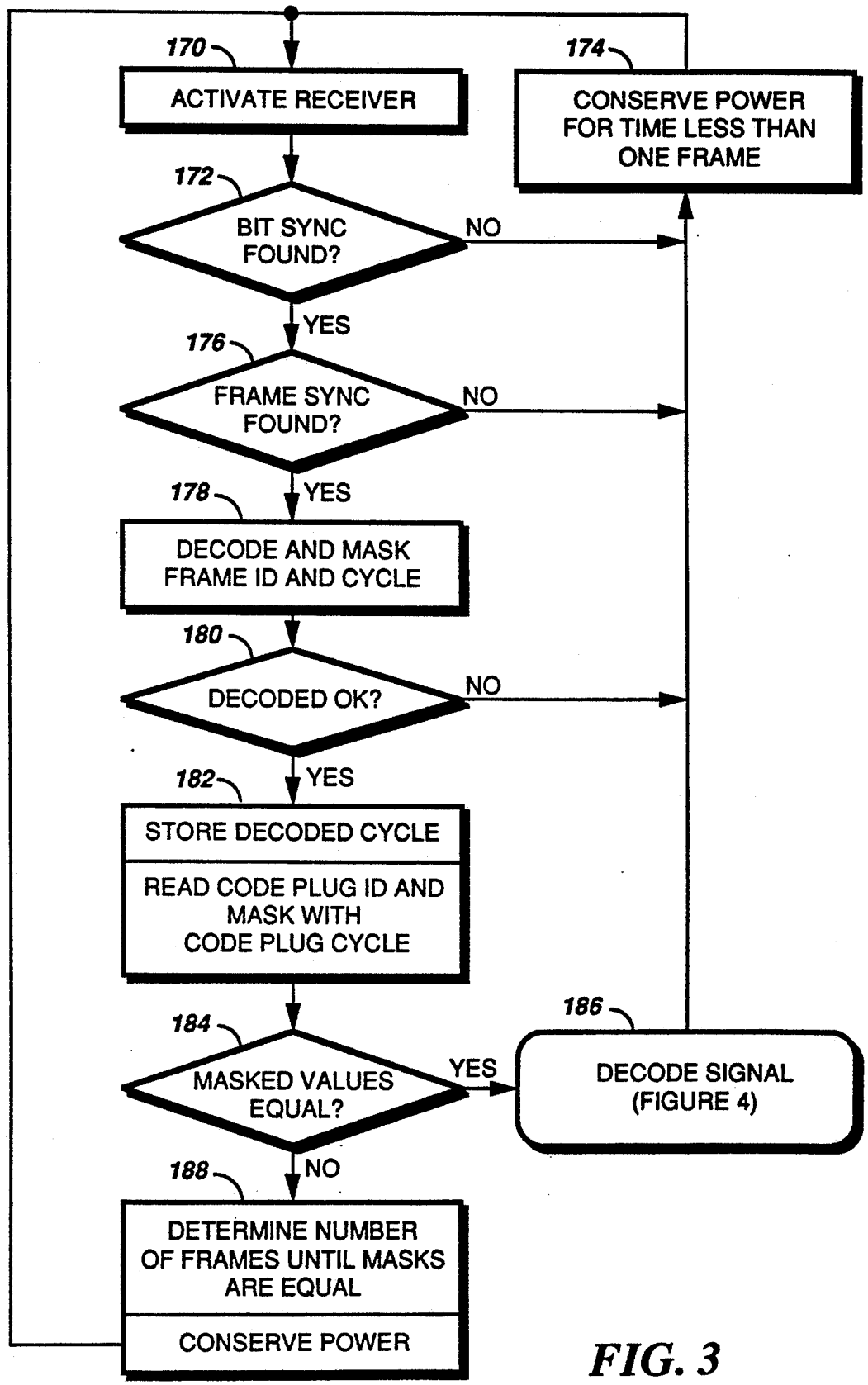
FIG. 3 a flow diagram of the selective call receiver of FIG. 2 illustrating the steps of decoding the synchronous signal in accordance with the preferred embodiment of the present invention.
Figure 4:
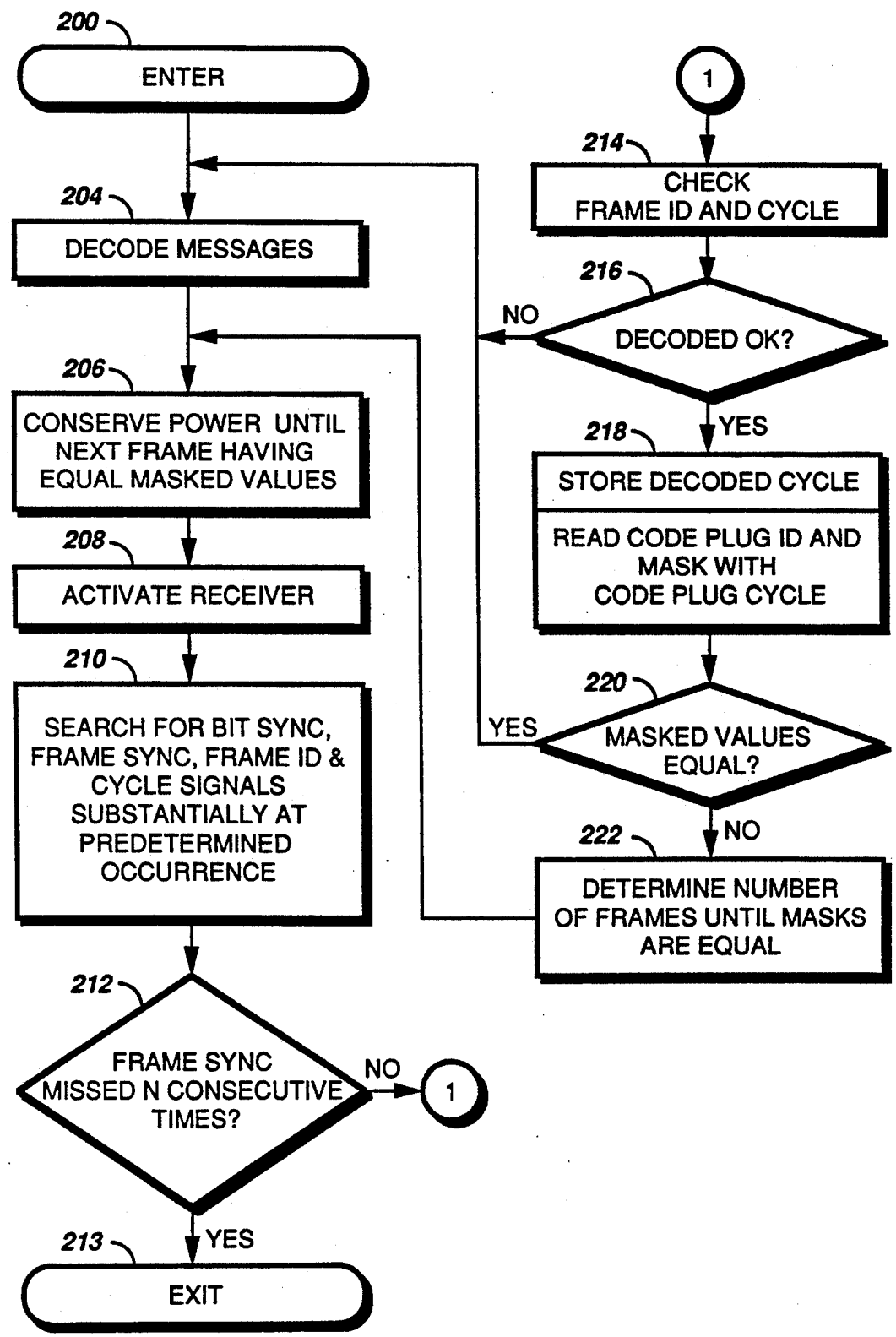
FIG. 4 a flow diagram of the selective call receiver illustrating the steps of synchronously decoding in accordance with the preferred embodiment of the present invention.

FIG. 3 shows a flow diagram illustrating the operation of the selective call receiver decoding a synchronous signal in accordance with the present invention. It is assumed the flow diagram begins with the selective call receiver in an unsynchronized state. In step 170, the receiver is activated. Step 172 attempts bit synchronization (bit sync) for a predetermined time, preferably a time greater than the time of one frame. If synchronization is unsuccessful, step 174 conserves power for a time less than the time of one frame. In other embodiments, the times of steps 172 and 174 may be varied. Thereafter step 170 is again executed. If in step 172, bit sync is found, step 176 searches for frame sync 104. If frame sync 104 is not found within a predetermined time, preferably a time greater than the time of one frame, step 174 is executed. However, if frame synchronization is found, step 178 decodes the frame ID signal 106 and cycle signal 108 and masks the signals together to generate a second mask value as will be described below. Then step 180 determines if the frame ID and mask were decoded OK. If not, a frame ID not recognized by this embodiment of the invention may be present, or the signal may have been corrupted by noise. In response thereof, step 174 is executed. If decoded OK, step 182 stores the decoded cycle value in a temporary register and reads from the code plug. The predetermined ID and cycle value are masked together (at mask function 134A) to obtain the first mask indicative of the first period of reception. For example, if the code plug contains a predetermined frame ID of 111 and a predetermined cycle value of 000, the resulting first mask value is 111. Similarly, if the decoded frame ID and cycle value were 001 and 100 respectively, the resulting second mask value (at mask function 134B) of X01 (the X indicating a "don't care"). Step 184 then compares the first and second masked values, 111 and X01 and finds them to be not equal. If however the decoded frame ID and cycle values were 011 and 100 respectively the resulting second mask would be X11, and step 178 would then compare the first and second masked values of 111 and X11 and find them to be equal. If the compared masks are equal, step 186 synchronously decodes the signal as indicated by FIG. 4. In response to step 184 determining the inequality, step 188 determines the next frame where the first and second masked values will be equal. In the preceding example, the decoded frame ID and cycle were 001 and 100 respectively and the resulting second masked value was X01, it can be determined that after two frames the resulting masked value would be X11 thereby providing an equality for step 184. This determination may be made because the frames are consecutively numbered. Thus step 184 would conserve power for two frames. Similar determinations may be made for systems having more frame numbers occurring in any predetermined sequence.

However, when the second masked value indicates the second period of response which is more frequent than the first period of response indicated by the first masked value, the period of power conservation will be reduced (less battery saving). In this way, a ubiquitous signal having a second mask indicative of the second period of response may be sent to all selective call receivers which have a first mask indicative of a first period of reception. Upon receipt, the selective call receivers determine whether to change their first period of reception to the second period of reception. Thus a selective call receiver terminal can instruct the selective call receivers to temporarily change their period of reception to ease traffic demand without knowing the period of receptions of different selective call receivers. Accordingly, the selective call receivers compare the generated second masked value with the generated first masked value to determine if the second period of reception is more frequent than the first period of reception, and if so, the period of reception will be changed.

FIG. 4 is a flow diagram illustrating synchronously decoding of the selective call receiver in accordance with the preferred embodiment of the present invention. The flow diagram is entered at step 200 from step 186 (as shown in FIG. 3). Step 204 decodes message signals from words 110 and any boundary signal from word 108. Those skilled in the art will appreciated that power conservation may be performed in this step by only activating the receiver in coincidence with the occurrence of address signals as indicated by a boundary signal. In the event of an address matching a predetermined address assigned to the selective call receiver, an alert is generated, and the message information signals associated with the address decoded. The message signal is then displayed to the user of the selective call receiver. In step 206, which is similar to the operation of step 188, the next frame having equal first and second masked values is determined. Power is then conserved until then. Then in step 208 the receiver is again activated. In step 210, bit and frame synchronization, and the frame ID and cycle values are searched for in substantial coincidence with their expected occurrence.

Step 212 checks if synchronization is maintained. Specifically, step 212 checks if frame synchronization has been missed for a predetermined number "N" consecutive times. In one embodiment, the number "N" is selected so that the selective call receiver synchronously operates in a noisy environment for several hours. If synchronization is not maintained, the flow exits through step 213 to step 174 of FIG. 3 to attempt to regain synchronization. By making the value for "N" large, the selective call receiver can efficiently conserve power in a noise environment. Additionally, the long synchronization lock time provided for by a large "N" provides for the interruption of the signal by other paging protocols communicating message information while maintaining bit and frame synchronization for the selective call receiver.

If synchronization is maintained, as is the expected typical case (step 212), step 214 checks if the frame ID and cycle values were correctly decoded. If not, the flow through step 216 returns to step 204 to decode messages, thereby maintaining the cycle value from a previous decoding of the cycle. Furthermore, in the event bit or frame synchronization were missed in step 210, bit and frame synchronization can be maintained from a previous successful synchronization. This path may be taken in the event a frame ID is not recognized by the selective call receiver or if the selective call receiver is in a noisy environment when an alternate paging protocol is being transmitted. In an alternate embodiment, if either the bit or frame synchronization, or frame ID or cycle values were missed, step 216 could proceed directly to step 206 thereby conserving power through the expected message words of the frame.

If the frame ID and cycle values are decoded OK in step 216, step 218 stores the new decoded cycle value in temporary memory and reads the frame ID and cycle from the code plug and masks them together as described above. Step 220 then checks if the result is substantially the same. If so, the flow returns to step 204. If no, the flow proceeds to step 222 to determine the number of frames until the masked values are again equal. The execution of step 222 is typically in response to a change in the received cycle value.

Figure 5:
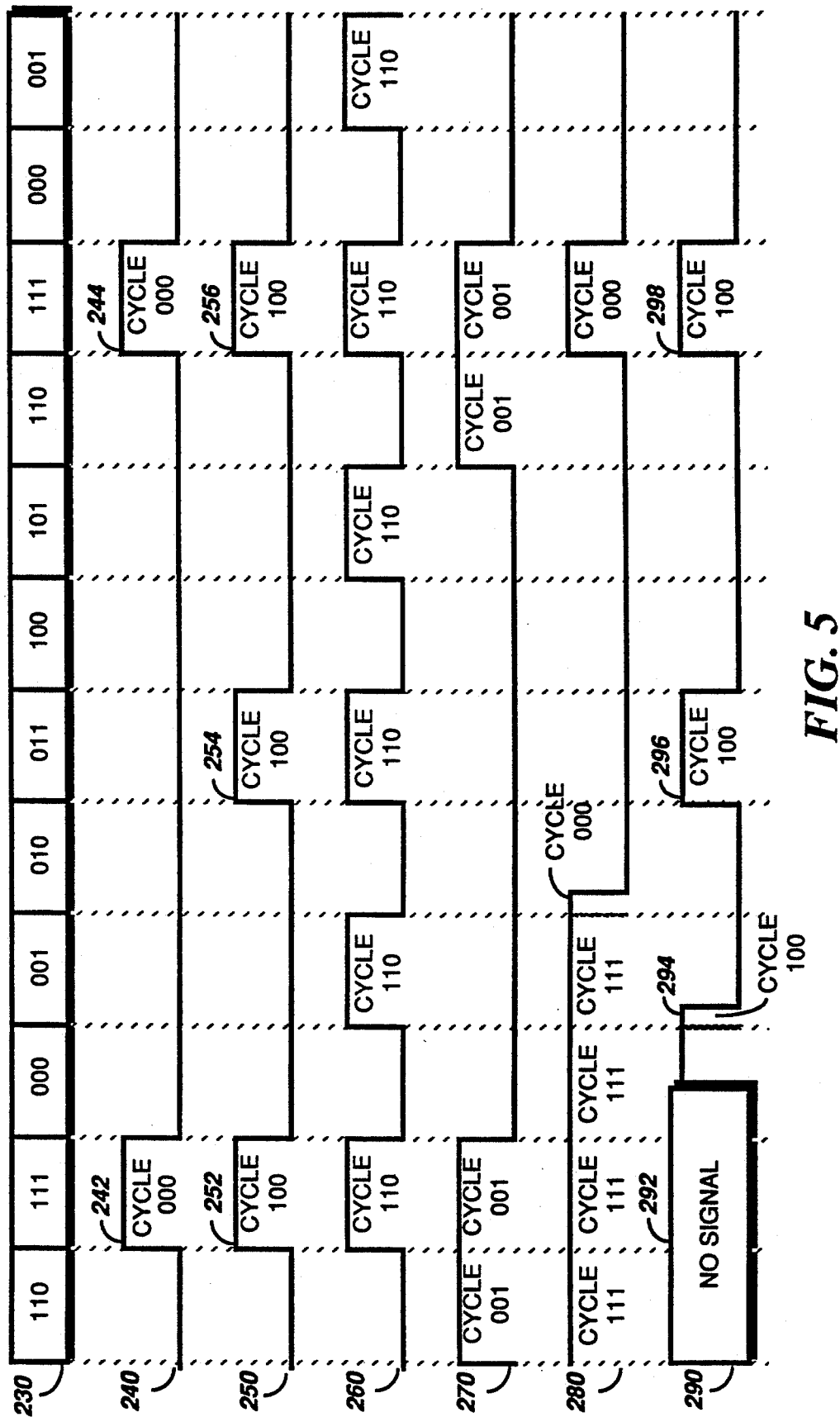
FIG. 5 is a timing diagram of a synchronous selective call receiver signal and the battery saver operation of the selective call receiver according to FIG. 2.

FIG. 5 shows an example of a synchronous paging signal and the battery saver operation of the selective call receiver of FIG. 2. For the sake of simplicity, the example shows a signal 230 having only $2^3$ (eight) repeating frames numbered 0-7. The frame numbers 0-7 are indicated with the binary equivalent values 000-111.

Lines 240-290 show battery saving and signal processing operation of a selective call receiver having a predetermined frame ID of 111 and a predetermined cycle value of 000 (thereby indicating the selective call receiver at the minimum decodes only in frame 111). A logic high on line 240-290 indicates the selective call receiver is receiving and processing information and a logic low indicates the selective call receiver is conserving power. Line 240 shows the selective call receiver operation when cycle signal 108 comprises a 000. This cycle signal indicates that only the frame assigned to the pager is to be decoded. This is evidenced by high logic states 242 and 244 which are in coincidence with frame 111.

Line 250 shows the selective call receiver operation with a cycle value of 100. In this case the resulting masked values of the received frame ID and cycle value is X11 during intervals 252, 254, and 256. A mask value of X11 equals the predetermined frame ID of 111 during frames 011 and 111 of line 230. Similarly line 260 shows the operation of the selective call receiver receiving a cycle value of 110 which causes the receiver to receive and process in frames 001, 011, 101, and 111. Similarly line 270 shows the operation of a pager receiving a cycle value of 001.

Line 280 shows the pager receiving a cycle value of 111 for four frames and a cycle value of 000 thereafter. When the cycle value is 111, the selective call receiver decodes in every frame, and when the cycle value is changed to 000, the selective call receiver decodes only in a frame having a frame ID equal to the predetermined ID assigned to the pager. Also, upon receiving a cycle value wherein the masked values are not equal, receiving and processing of the frame is terminated. However, because the frames are numbered in a predetermined sequence, the pager is capable of reactivating precisely in time to decode the correct frame. In this way, the selective call receiver by comparing a second received masked value with the corresponding first masked value can increase the period of reception for receiving relocated frames to reduce traffic build-up or message queuing within the selective call receiver system.

Line 290 shows the selective call receiver synchronizing to the system. During interval 292 no signal is received, possibly because the selective call receiver was switched off during this interval. During interval 294 the signal is received and bit and frame synchronization are accomplished. Then a frame ID of 001 and a cycle value of 100 is detected. The selective call receiver then determines that frame 011 results in matching masked value, and conserves power for the duration of frame 001 and receives and processes information during frame 011 as shown by interval 296. The selective call receiver is synchronized to the system and conserves power after frame 011 until frame 111 wherein the masked values are again equal.

Thus FIG. 5 shows that a selective call receiver may be reassigned to a number of frames using the received cycle value and its internal masked value. The selective call receiver may additionally quickly determine the proper frame for decoding in the event the cycle value is changed, or when synchronization is initially acquired. In systems having more than eight frames, such as sixty four frame system, the advantages to battery saving and traffic management are even more evident. However, when the selective call receivers are directed to a second period of reception through the received second masked value, the battery saving features of the selective call receiver are inhibited in the interest of reducing traffic build-up or message queuing. That is, selective call receivers are directed to access frames at a more frequent rates than is indicated by the internal generated first masked value. Therefore, using the transmitted second masked value, a selective call receiver system can temporarily change the period of reception of the selective call receivers without knowing the period of receptions of the selective call receivers to reduce traffic build-up, etc.

Figure 6:
FIG. 6 shows a table of the possible frames which may be decoded by a selective call receiver having a predetermined ID for receiving the signal of FIG. 5.

FIG. 6 shows a table of the possible frames in which a selective call receiver having a predetermined ID of 111 operating in the eight frame system protocol of FIG. 5 to decode signals. The selective call receiver has a predetermined cycle value of 000. The top row corresponds to the frame numbers of line 230 of FIG. 5. The left column corresponds to the decoded cycle signal 108 of FIG. 1, that is, the received second masked value indicates a second period of reception. A "YES" entry in the table corresponding to the top row and left column indicates the frame in which the selective call receiver of the example will receive and process information. It can be seen by the column associated with frame 111 that the selective call receiver of the example will always be active in its own frame. It can be further seen by viewing the bottom row that a cycle value of 111 will cause the selective call receiver to be active in every frame. In this way, the selective call receiver is instructed to temporarily increases the period of reception for reducing traffic build-up on the system.

Figure 7:
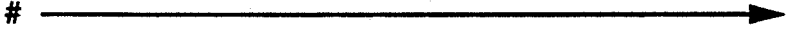
FIG. 7 shows a table of possible frames which may be decoded by the selective call receiver of FIG. 6 in response to an alternate predetermined cycle value.

FIG. 7 shows a table of possible frames of the selective call receiver of FIG. 6 wherein the selective call receiver alternately has a predetermined cycle value of 100. The resulting masked value is X11. Thus the selective call receiver behaves as if the selective call receiver assigned to both frames 011 and 111.

Figures 8, 10:
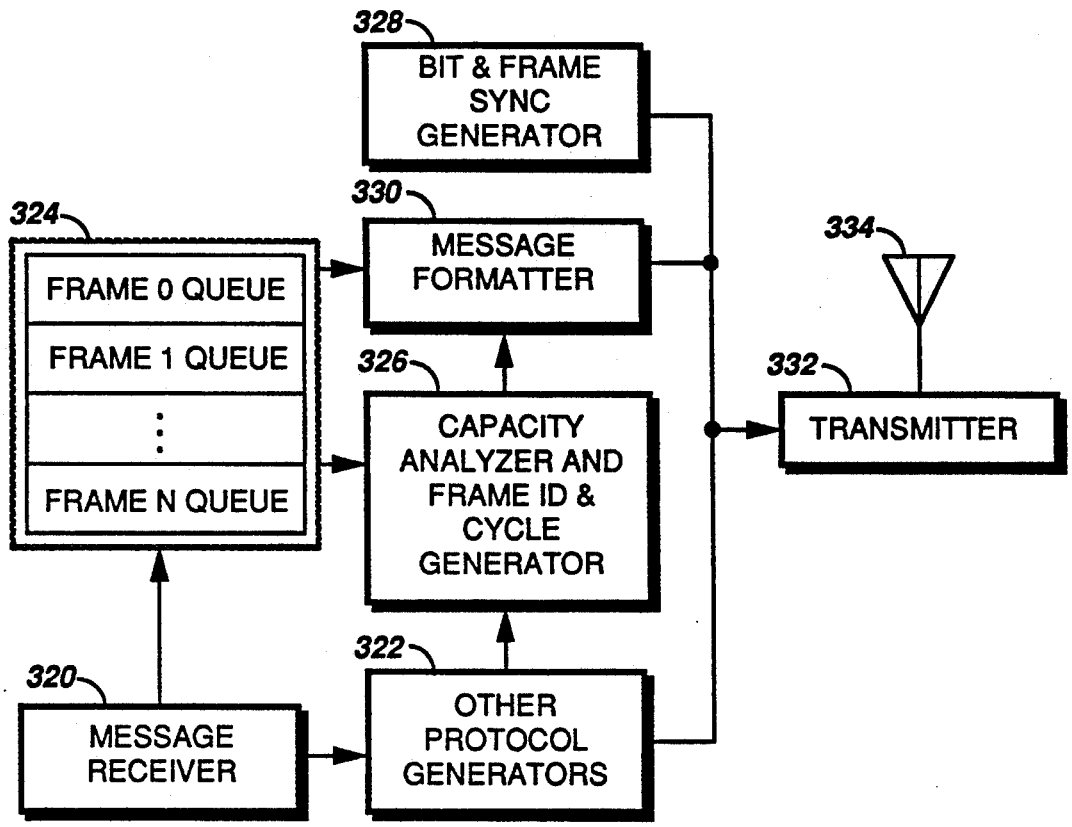
FIG. 8 shows a block diagram of a paging terminal for generating a paging signal in accordance with FIG. 1.
FIG. 10 shows a table indicating frames the selective call receivers will decode in response to the cycle signal.

FIG. 8 shows a block diagram of a paging terminal generating a paging signal in accordance with FIG. 1. The functions of the paging terminal is implemented within software, for example within a MODAX 500 Radio Paging Terminal which is manufactured by Motorola Inc. As shown, message receiver 320 receives messages for selective call receivers typically from the public switched telephone network. The appropriate protocol and address is determined for the message. If the message is not to be sent via the signal format of the present invention, it is sent to one of the other protocol generators 322 which may include GSC and POCSAG protocol generators. Messages to be transmitted on the protocol of the present invention are stored in a frame queue buffer 324 which has queues for the corresponding frames of the signal. The predetermined frame ID of the pager corresponding to the message is determined and the message is stored in the corresponding frame queue. Capacity analyzer and frame ID/cycle generator 326 determine the sequence of frame IDs to be transmitted, analyze the capacity of each frame and determine the cycle value to be used. The capacity analyzer is also responsive to other protocols being transmitted. For example, if the expected occurrence of a frame is to be replaced by the transmission of one of the other protocols (thereby diminishing the capacity of the frame), the capacity analyzer can account for this with the determined cycle value. Bit and frame sync generator 328 synchronously generates bit and frame synchronization signals. Message formatter 330 determines in response to the current combination of selective call receivers decoding messages in a frame, the frame queues from which messages may be included within the current frame. The messages are then formatted for transmission. Transmitter 332 accepts signals from blocks 328, 330 and 322 and modulates and transmits radio frequency paging signals to selective call receivers via antenna 334 in a manner well known to those of ordinary skilled in the art.

Figure 9:
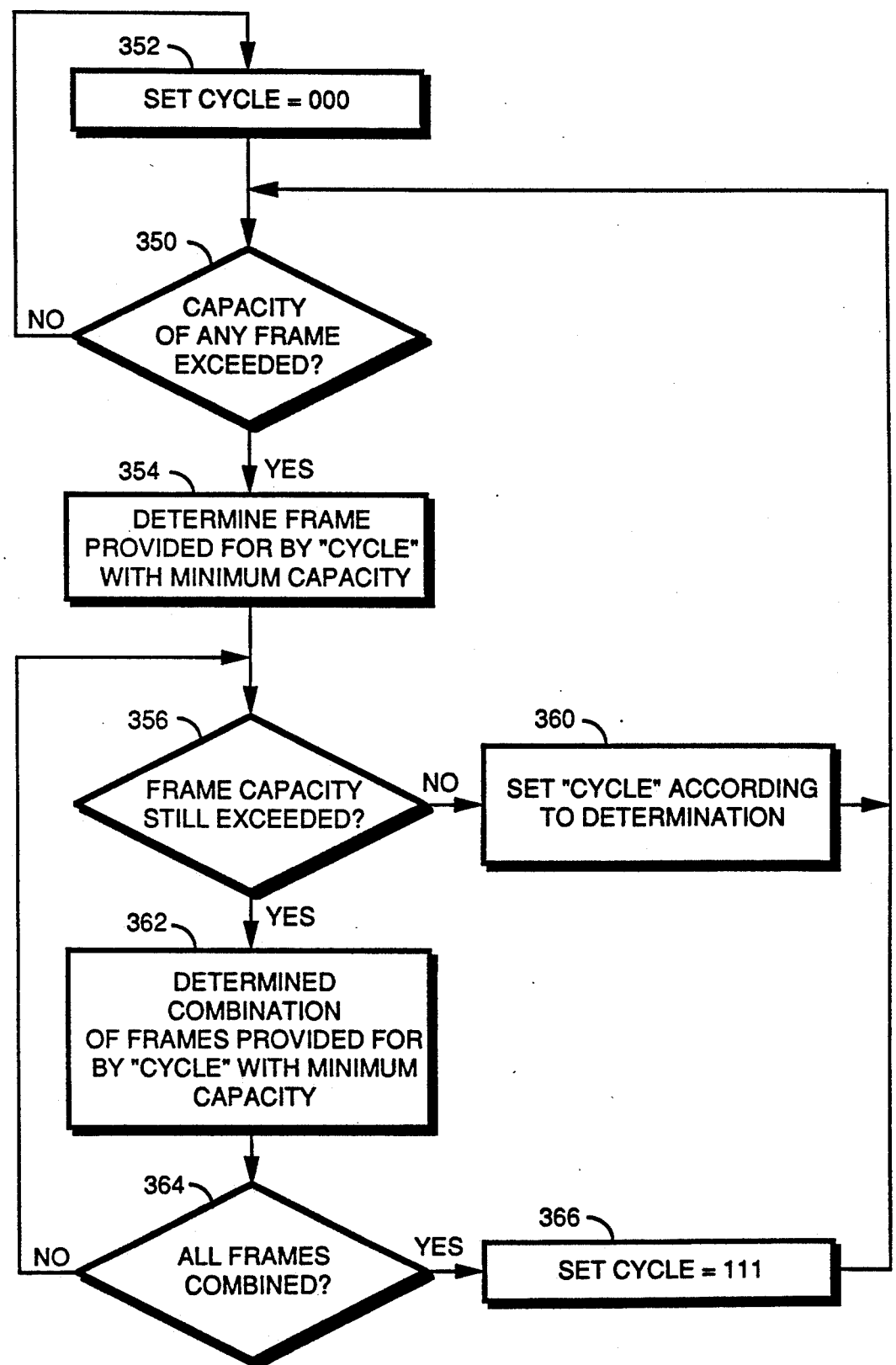
FIG. 9 shows a flow diagram of the operation of the capacity analyzer and cycle generator in accordance with FIG. 8.

FIG. 9 is a flow diagram illustrating the operation of the capacity analyzer and cycle generator of FIG. 8. Step 350 examines the frame queues of buffer 324. With each frame being approximately 4 seconds long and having a base data rate of 1200 bits per second, each frame capacity is approximately 4,800 bits of synchronization and information code words. If the traffic capacity of any of the buffers is not exceeded, step 352 sets the cycle value to 000, thereby causing the selective call receivers to operate only in frames corresponding to the information (first masked values) within their respective code plugs. If however, the frame capacity is exceeded, step 354 determines a frame having a lesser capacity utilization (lesser traffic) which is available for combining by the cycle value, and the frames are combined. The step 356 determines if the frame capacity of the combined frames are still exceeded. If not, step 360 sets the cycle value according to the determined value. If however the capacity is still exceeded, step 362 combines more frames as provided for by the cycle value. Then step 364 determines if all of the frames of the system have been combined. If not, the program returns to step 356 and a check for exceeded capacity is again made. If in step 364 all frames are combined, a cycle of 111 is selected. Process continues in step 350 from either step 360 or step 366. This process allows for continuous adjustment of the cycle value to accommodate variation in message traffic which cause the capacity of frames to be exceeded. It should be appreciated that the rate of change of the cycle value may be further governed in order to regulate rapid changes in the operation of the paging system. Additionally, the changes in the operation can be weighed against the extra power consumption and the changes cause in the individual selective call receivers with the paging system. Selective call receivers directed to decode in extra frame in response to the cycle value also expend additional power while decoding in those frames, thus frustrating their battery saving features in the interest of reducing the traffic on the paging system.

FIG. 10 shows a table indicating the frames in which selective call receivers will decode in response to the cycle signal. The table corresponds to the eight frame ID example described above. The top row indicates the frame ID number while the left column indicates the cycle value. The entries in the table correspond to the decimal equivalent of selective call receivers having predetermined frame IDs which decode information in that frame. As can be seen, a cycle value of 000 causes only selective call receivers having the predetermined frame IDs matching that frame ID to decode in that frame, while a cycle value of 111 causes all selective call receivers (predetermined frame IDs of 0-7) to decode in every frame.

An example of the use of the table is given below. For example, if the traffic capacity of frame 7 (111) is exceeded, and upon examining the other frame queues, it is determined that substantial capacity of frame 3 is not utilized. Frames 7 and 3 may be combined with a cycle value of 100. This cycle value may be utilized until the capacity of frame 7 is no longer exceeded (in response to which the cycle value would be returned to 000). If however the capacity of combined frames 3 and 7 are still substantially exceeded and it is determined that frames 1 and 5 still have remaining capacity, a cycle value of 110 could be used thereby combining frames 1, 3, 5, and 7. In this way, the paging terminal transmits information to the selective call receivers which is combined with the internal first masked value of the selective call receivers to determine the change in the period of reception for relieving traffic variations with the paging system.

Thus, a selective call receiver responds to the synchronized signal generated from the paging terminal to receive at least one additional frame at a second period of reception as described above. Some selective call receivers may require additional battery saver performance and may not respond to the cycle value, thereby decoding only those frames indicated by the code plug. Alternately, the selective call receiver could respond only to a portion of the cycle value. In such an embodiment the selective call receiver may only respond to the least significant one or two bits of the cycle value thereby limiting the number of possible frames in which the pager must be active in order to decode message information. The paging terminal must correspondingly be programmed with a table of selective call receivers having limited response to the cycle value in order to direct message information to those selective call receivers in the proper frames.

Figure 11:
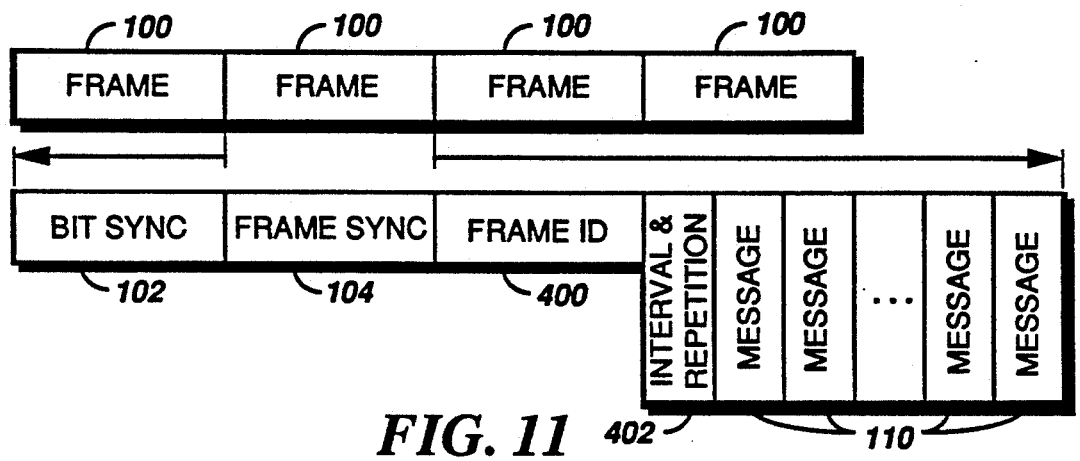
FIG. 11 shows a synchronous signal in accordance with a second embodiment of the present invention.

FIG. 11 shows an alternate signal in accordance with a second embodiment of the present invention. The signal has substantially the same attributes as described in the signal of FIG. 1 with the exception of words 400 and 402. Word 400 includes the frame IDs which need not be numbered in sequence and is preferably one of any number of frame IDs. This enables addition of frame IDs to the paging system as the requirements change. However, each frame ID has a predetermined period which need not be the same period as other frame IDs on the system. Word 402 comprises interval and/or repetition values, and includes, additionally, a boundary signal indicative of the boundary between address and data portions of words 110.

Figure 12:
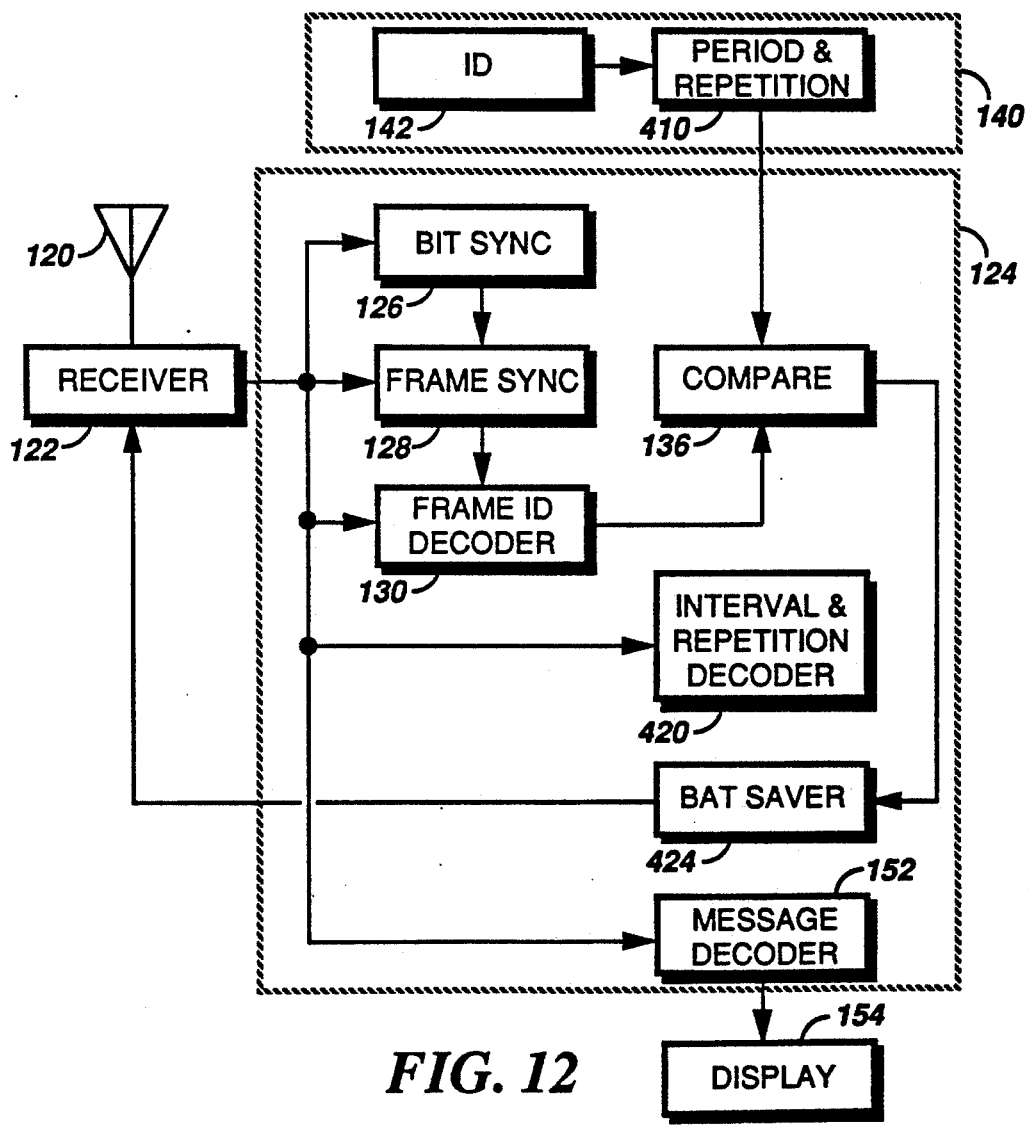
FIG. 12 is a block diagram of the preferred embodiment of a selective call receiver for decoding the signal illustrated in FIG. 11.

FIG. 12 illustrates the block diagram of the paging receiver for decoding the signal of FIG. 11. The majority of the functions of the selective call receiver are identical with the selective call receiver of FIG. 2. Antenna 120, receiver 122, and display 154 are substantially identical in function to those of FIG. 2. Code plug 140 includes the predetermined frame ID 142 and further includes a predetermined period and repetition values 410. The period corresponds to the predetermined period of the predetermined frame ID 142. Decoder 124 has bit and frame synchronizers 126 and 128 respectively, and frame ID decoder 130 and message decoder 152 have substantially the same operation. Interval and repetition decoder 420 decodes signal 400. Comparator 422 sends a signal to battery saver 424 when the decoded frame ID equals the predetermined frame ID 142. In response to the comparator 422, the interval and repetition signal 402, the predetermined period, and repetition 410, the battery saver 424 causes the receiver 122 to either activate or conserve power.

Figure 13:
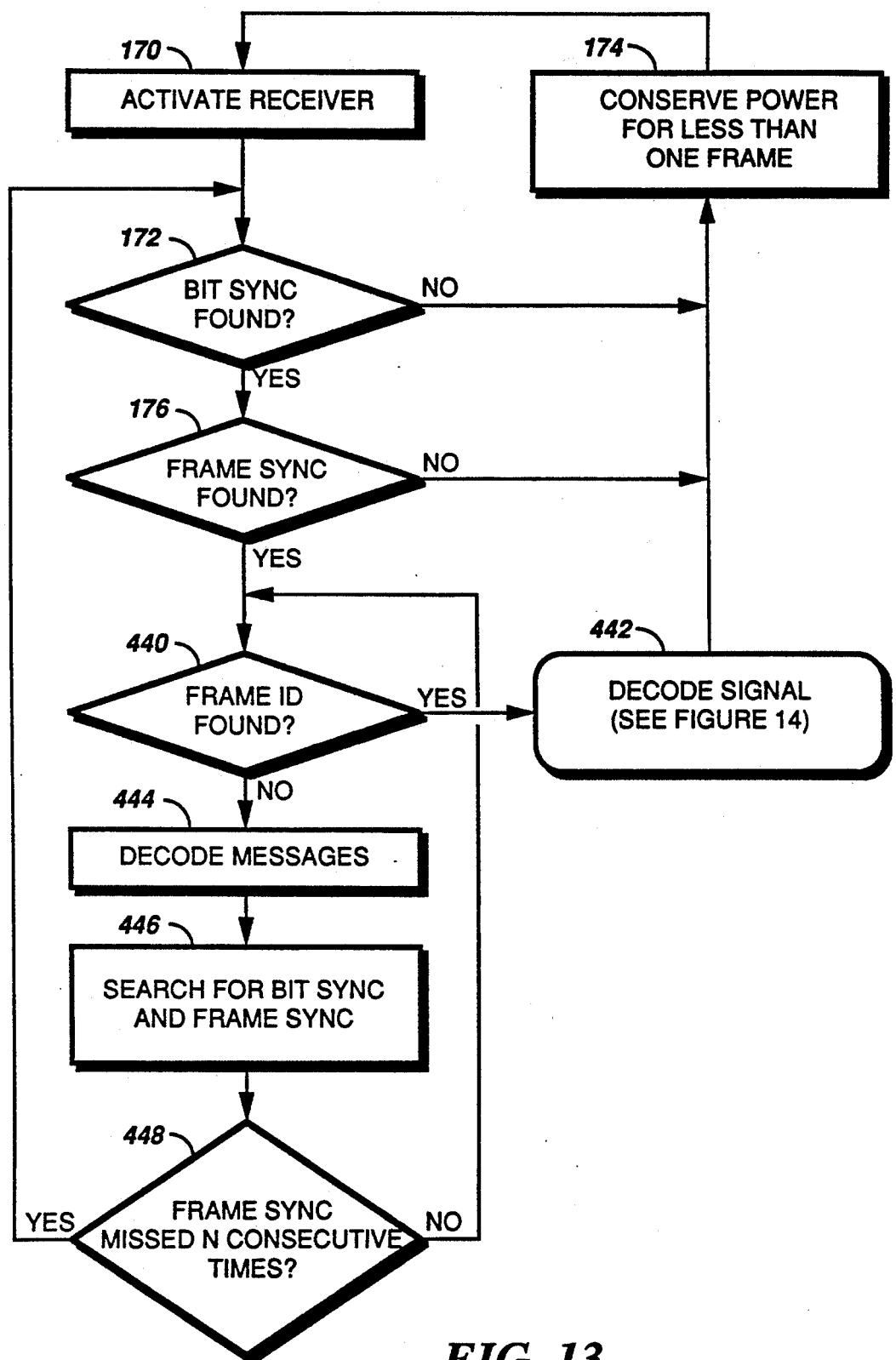
FIG. 13 is a flow diagram illustrating the operation of the selective call receiver according to FIG. 12.

FIG. 13 is a flow diagram illustrating the operation of the receiver of FIG. 12. Steps 170-176 have been described with respect to FIG. 3. Accordingly, upon finding frame synchronization in step 176, step 440 checks if the received frame ID 400 matches the predetermined ID 142. If equal, synchronous decoding occurs in step 442 which is described in detail in FIG. 14. If the inequality is determined in step 440, step 444 decodes messages within the frame. The functions of this step are similar to those of step 204 of FIG. 4. If an address matching a predetermined address assigned to the selective call receiver is found, an alert is generated, and information associated with the address may be decoded and stored for displaying. Power conservation is performed in this step after the address portion of the frame is received. Step 446 again searches for bit and frame synchronization. Step 448 checks if frame synchronization has been missed for a predetermined number of times. If yes, step 172 is again executed and synchronization is again acquired. If no, step 440 is again executed.

The flowchart of FIG. 13 provides for decoding of information within every frame until a frame having a frame ID corresponding to the predetermined frame ID is found. If the synchronization of step 446 is unsuccessful, subsequent executions of step 444 may use the synchronization from prior successful attempts. Alternately, step 444 conserves power during the remainder of a frame if the synchronization of step 446 was unsuccessful.

Figure 14:
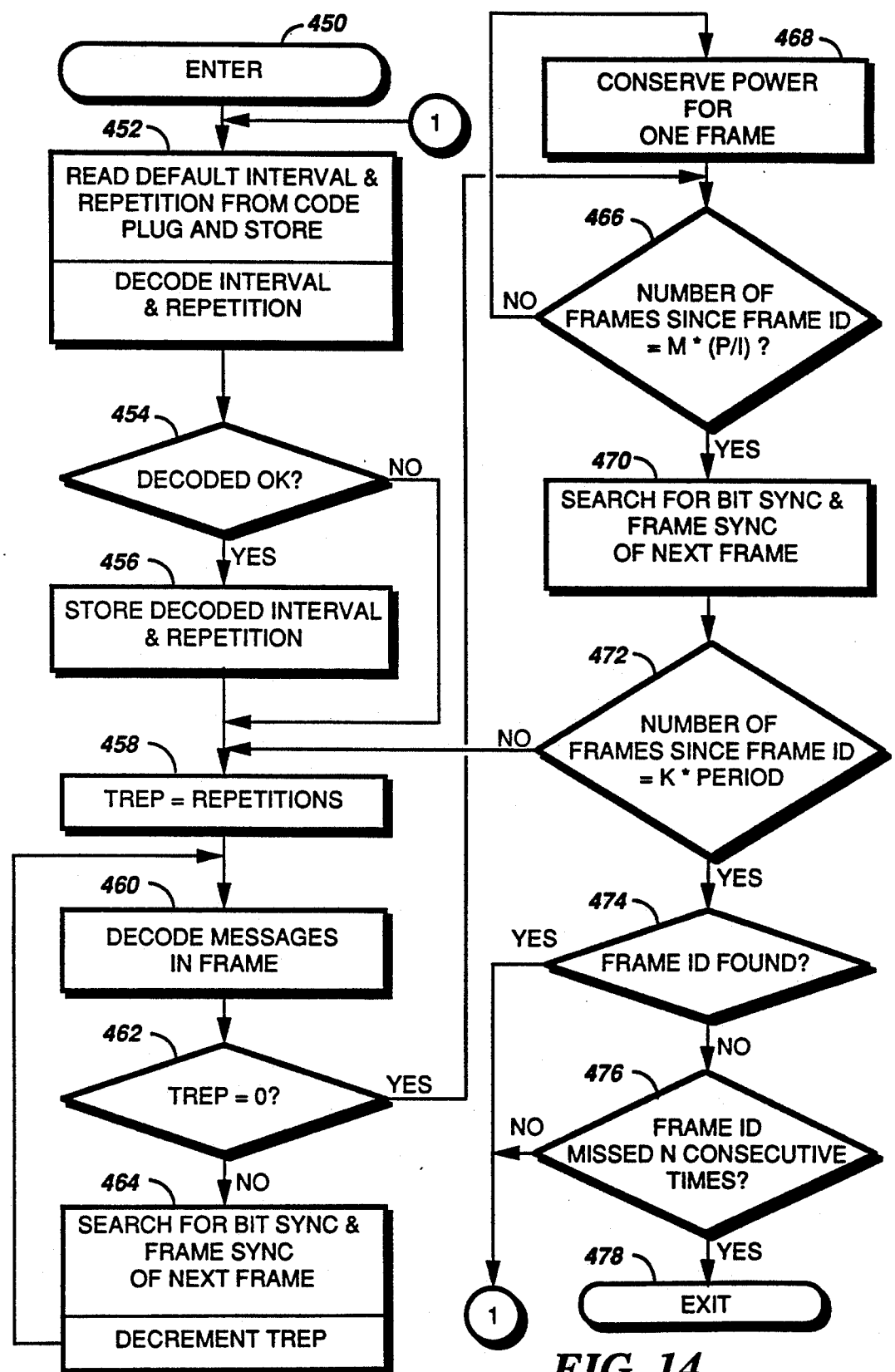
FIG. 14 is a flow diagram further illustrating the synchronous operation of the selective call receiver of FIG. 12.

FIG. 14 is a flow diagram illustrating the synchronous operation of the receiver of FIG. 12. The flowchart is entered at step 450 via step 442 of FIG. 13 when the frame ID 400 matches the predetermined ID 142. Step 452 then reads default interval and repetition values 410 from the code plug and stores the values temporarily in memory. The received interval and repetition signal 402 is also decoded. If decoded OK, step 454 causes step 456 to substitute the decoded values with the corresponding values from the code plug by overwriting the temporary memory. If not decoded OK, step 456 is bypassed, and the code plug values remain in temporary memory. The step 458 sets a temporary variable TREP equal to the repetition value stored temporarily in memory. Then, similar to the processes described in step 444, step 460 decodes the messages in the frame. After decoding the frame, step 462 checks if TREP value is zero. If no, step 464 searches for bit and frame sync in the next frame, decrements TREP and returns to step 460. Steps 460-464 provide for a number of frames to be decoded in repetition according to a repetition value either received in the signal or stored in the selective call receiver code plug. A preferred application is to have the transmitted repetition value less than or equal to the repetition value of the code plug.

After the repetition cycle is completed (zero), step 466 determines if the number of frames subsequent to decoding of the frame ID is equal to a non-zero integer value M multiplied by the ratio of the predetermined period P, and the interval I which is stored in the temporary memory. If no, power is conserved for one frame in step 468 and step 466 is again executed. Steps 466 and 468 provide for variations in the interval in which frames are decoded. If for example, the received interval had a value of one, executions of step 466 would result in an inequality until the number of frames after the frame ID equal the period of the frame ID (e.g., M=1). In another example, if the predetermined period of the frame=8 and the received interval=1, step 466 would result in an equality (M=1) after eight frames have elapsed after the detected frame, which would be in coincidence with the next occurrence of the frame. If however, the received interval was 2, step 466 would result in an equality (M=1 and 2) both after four and eight frames have elapsed after the prior detected frame, the latter would be in coincidence with the the next occurrence of the frame, while in the former, additional message information may be included for selective call receivers assigned to the frame.

When step 466 results in an equality, step 470 activates the receiver and searches for bit and frame synchronization. Then step 472 determines if the number of frames after the detected the frame ID corresponds to an integer K multiplied by the predetermined period of the frame ID. If false, step 472 proceeds to step 458 to decode the number of frames specified by the repetition value stored in temporary memory. If yes, step 474 checks if the frame ID is found. If found, step 452 is again executed through connector "1", otherwise step 476 checks if the frame ID has been consecutive missed for a predetermined number N. If no, synchronization is maintained, and step 452 is again executed. If yes, the flow returns 478 to reacquire synchronization at step 174 of FIG. 13. In a typical operation, step 474 is executed in correspondence with the predetermined period of the predetermined ID assigned to the selective call receiver. The predetermined value N of step 476 may be selected to maintain synchronization for long periods of time in the absence of signal. These periods can extend to hours or days depending on parameters of the system, thereby providing for efficient battery saving in the absence of a signal receivable by the selective call receiver.

Figure 15:
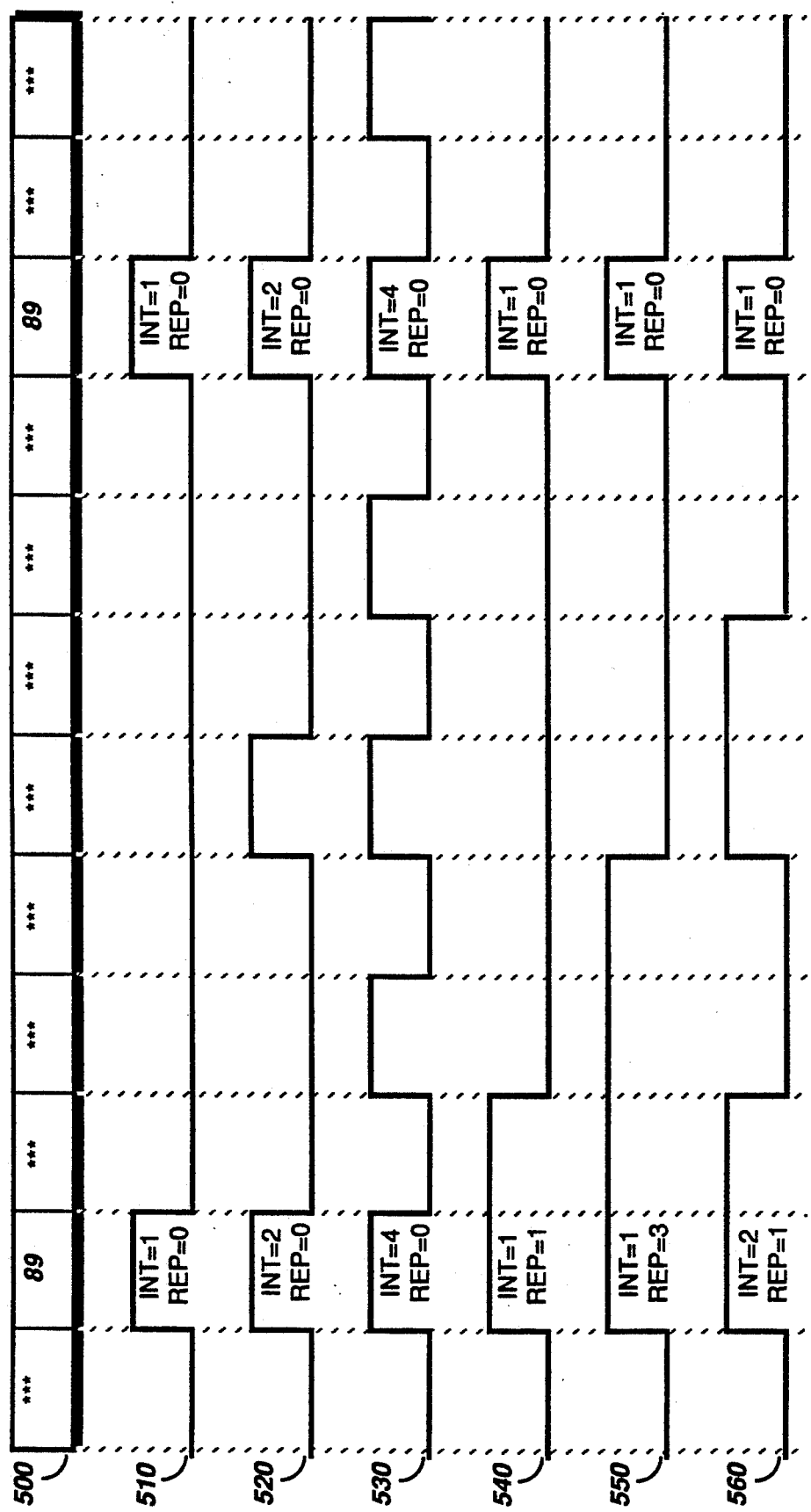
FIG. 15 shows a timing diagram of a synchronous selective call receiver signal and the battery saver operation according to the selective call receiver of FIG. 12.

FIG. 15 shows an example of a synchronous paging signal and the battery saver operation of the pager of FIG. 12. In this example, the selective call receiver has a predetermined frame ID of 89. Line 500 shows that the predetermined period of frame 89 is 8 frames, that is, a frame having an ID of 89 occurs every eighth frame. The frame IDs of the intervening frames are shown as "***" and are not relevant because the selective call receiver only recognizes the frame ID of 89. Lines 510-560 show the power conservation and receiving and processing strobe of the selective call receiver. A logic high indicates frames where the selective call receiver is receiving and processing information and a logic low indicates frames where the selective call receiver is conserving power.

Line 510 shows the selective call receiver receives and processes only during the occurrence of frames having an ID of 89 (every eighth frame), that is, when the interval signal is a 1 and the repetition signal is a 0. Line 520 shows that the selective call receiver receives and processes every fourth frame when the interval signal is a 2 and the repetition signal is a 0. Note that any frame ID, interval, or repetition signal in the fourth frame after frame 89 is ignored by the selective call receiver since it does not occur in a frame having an ID of 89. Line 530 shows that the selective call receiver receives and processes every other frame when the interval signal is a 4 and the repetition signal is a 0. Line 540 shows that the selective call receiver receives and decodes in 2 consecutive frames in response to the repetition signal being a 1. Line 550 shows that the selective call receiver receives and decodes in 3 consecutive frames in response to the repetition signal being a 3. Finally, line 560 shows that the selective call receiver receives and decodes in two consecutive frames every fourth frame in response to the interval signal being a 2 and the repetition signal being a 1.

FIG. 15 shows the flexibility of programming frames for a selective call receiver using the interval and repetition values. A selective call receiver assigned to a particular frame ID may be programmed to decode in various frames. Furthermore, a first frame ID may have a period different from a second frame ID. In this way, the paging terminal may redirect selective call receivers to different frames for reducing the traffic with the paging system. Furthermore, the internal mask of the selective call receivers enables the paging terminal to reassign selective call receivers without knowing their specific period of receptions, because the internal mask determines if the particular selective call receiver may be reassigned.

Figure 16:
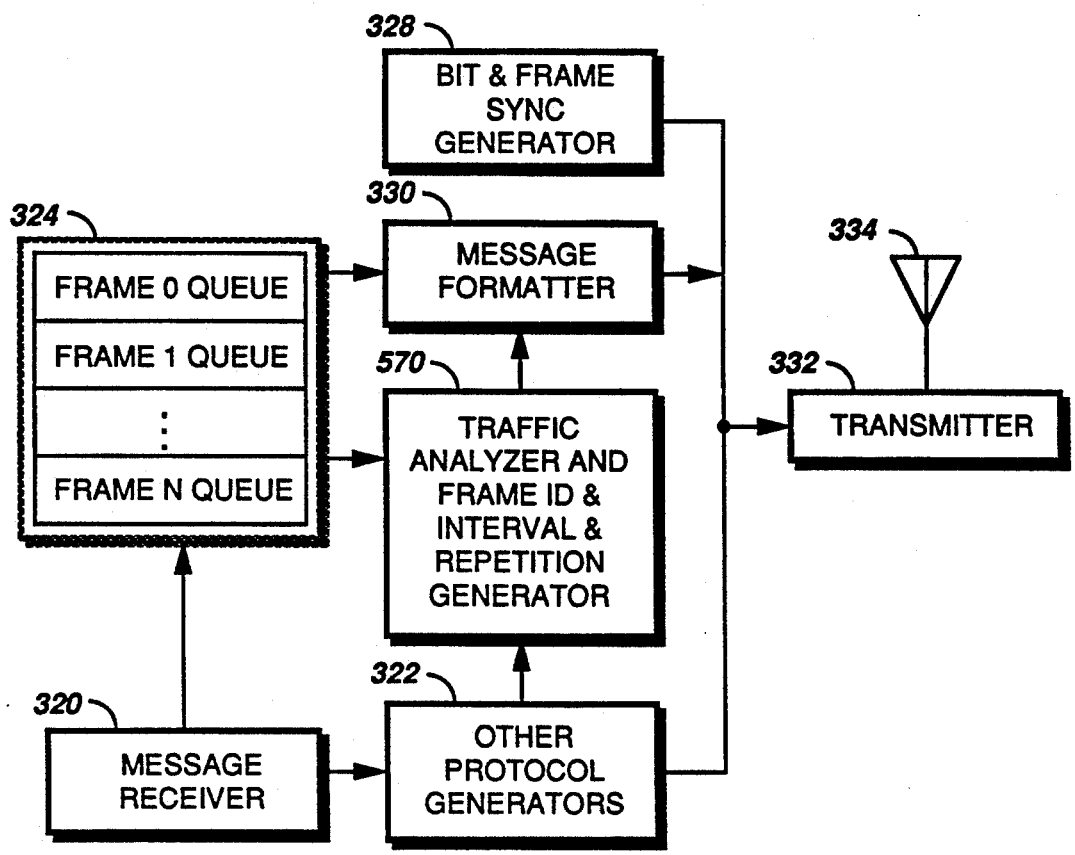
FIG. 16 shows a block diagram of a selective call receiver terminal generating a paging signal in accordance with FIG. 11.

FIG. 16 shows a block diagram of a paging terminal generating a paging signal in accordance with FIG. 11. The functions of the paging terminal are substantially identical to the functions described with respect to FIG. 8 having identification numbers corresponding thereto. The difference is the traffic analyzer and frame ID, interval and repetition generator function 570. This function generates frame IDs at the predetermined period, determines the interval and cycle values to be included within a frame in response to the traffic conditions of the frame. As in the capacity analyzer 326 of FIG. 8, block 570 is also responsive to other protocols being transmitted.

Figure 17:
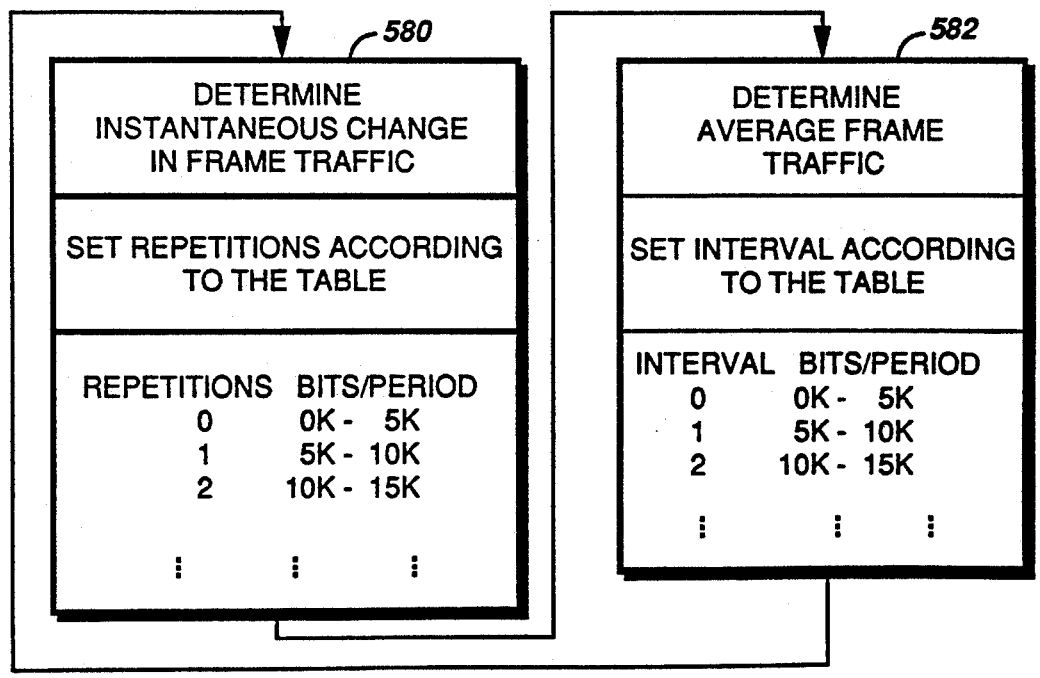
FIG. 17 is a flow diagram showing the operation of the traffic analyzer and interval and repetition generator of FIG. 16.

FIG. 17 shows the operation of the traffic analyzer and interval and repetition generator. When a frame ID is being transmitted, step 580 sets the repetition value. First the instantaneous change in traffic for the frame is determined. If the increase in traffic from a prior period of the frame is in the range of 0 to five thousand bits, a repetition value of zero is selected. This indicates a steady average traffic for the frame. If however, a change in the order of five thousand to ten thousand bits per period was detected, the repetition value of one is selected. This value would represent a momentary substantial increase in frame traffic such as the increase due to one very long information message. This kind of increase is compensated for by causing selective call receivers to immediately decode in the following frames. The repetition value increases as the magnitude of the instantaneous traffic increases. Thereafter, step 582 determines the average frame traffic. This determination may be made by averaging the number of bits per period received for the frame over a predetermined number of frame periods. Step 582 shows that the interval is set to zero if the average traffic is zero to five thousand bits, and the interval value increases with increasing traffic.

Thus FIG. 17 shows increasing the repetitions of selective call receivers assigned to a frame ID in response to instantaneous changes in frame traffic and increasing the interval in response to changes in the average traffic of a frame ID. Different criterion can be used to adjust repetition and interval values in other embodiments. In this way, the paging terminal may redirect selective call receivers to different frames for reducing the traffic with the paging system. The internal mask of the selective call receivers enables the paging terminal to reassign selective call receivers without knowing their specific period of receptions, because the internal mask determines if the particular selective call receiver may be reassigned.

Figure 18:
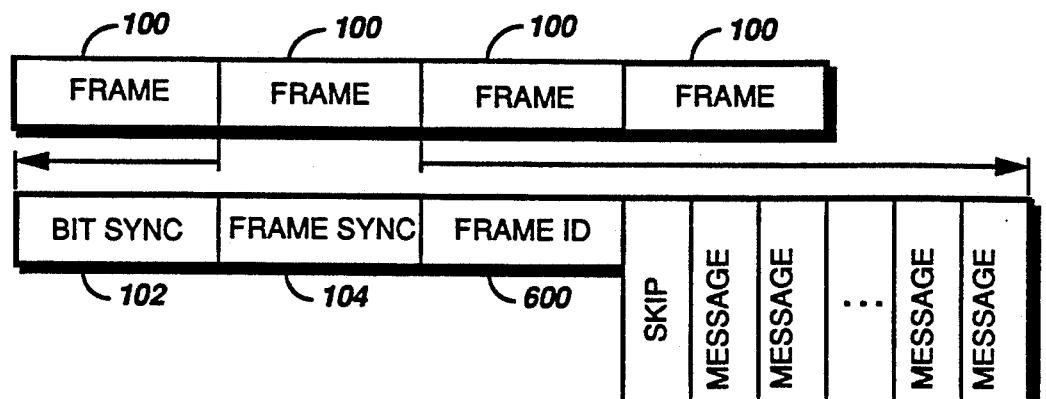
FIG. 18 shows a synchronous signal in accordance with a third embodiment of the present invention.

FIG. 18 shows a synchronous signal in accordance with another embodiment of the present invention. Word 600 includes frame IDs which need not be sequentially numbered, and may have any number of frames IDs. Furthermore, additional frame IDs may be added as the system requirements change, and each frame ID may occur at any interval. Thus a frame ID may "skip" through the synchronous signal as required. Word 602 comprises a "skip" value which indicates the minimum number of frames until the occurrence of the frame ID, and may also include an additionally boundary signal indicative of the boundary between the address and data portions of words 110.

Figure 19:
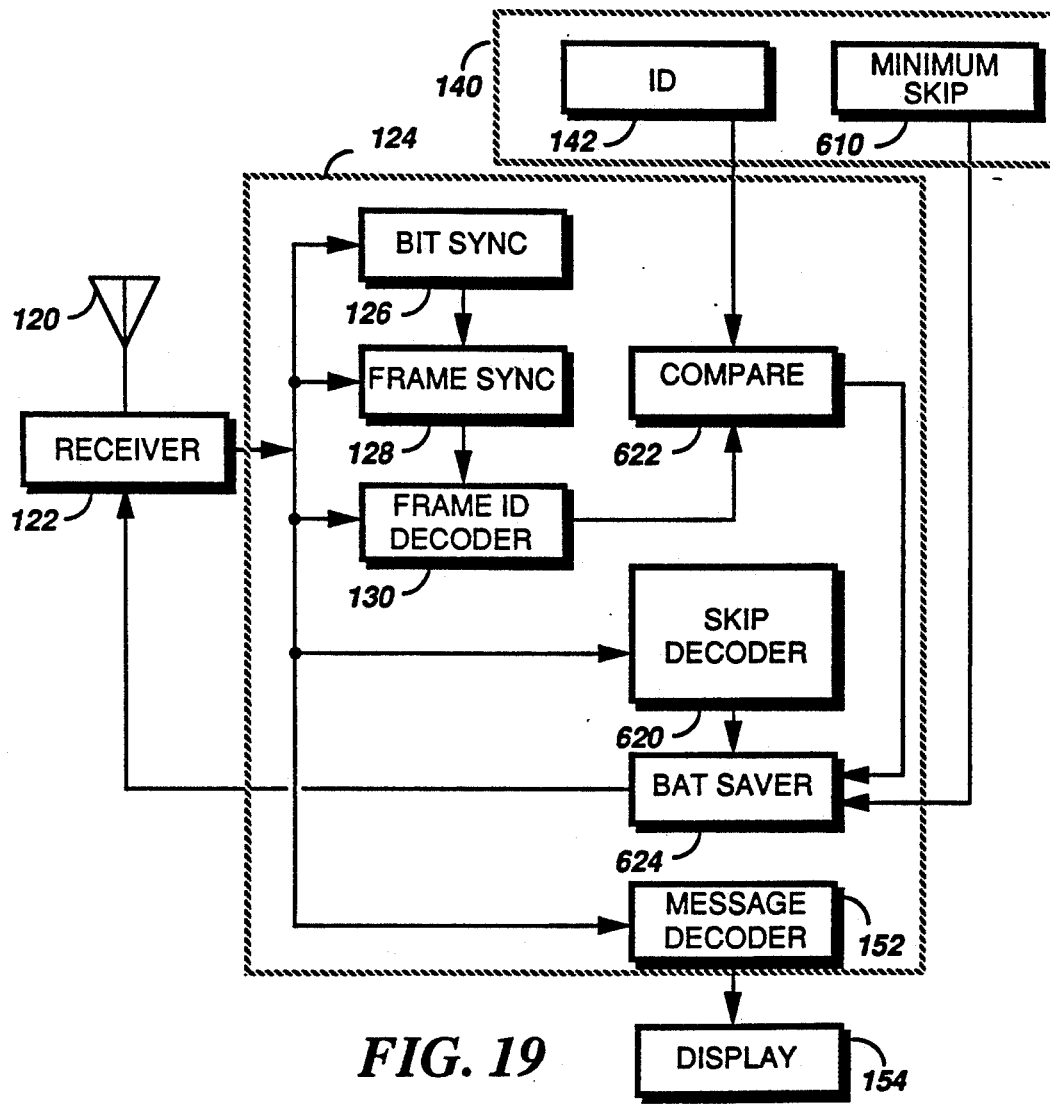
FIG. 19 is a block diagram of the selective call receiver capable of decoding the signal of FIG. 18.

Accordingly, FIG. 19 shows a block diagram of the paging receiver which decodes the signal of FIG. 18. The majority of the functions of the selective call receivers are identical with the selective call receiver of FIG. 2. Antenna 120, receiver 122, and display 154 are substantially identical in function to those of FIG. 2. The code plug 140, however, includes the predetermined frame ID 142 and a predetermined minimum "skip" value 610. Decoder 124 has bit and frame synchronizers 126 and 128, and a frame ID decoder 130 and message decoder 152 which operate substantially the same as those of FIG. 2. Skip decoder 620 decodes signal 602. Comparator 622 sends a signal to battery saver 624 when the decoded frame ID equals the predetermined frame ID 142. In response to the comparator 622 and the skip signal 602, battery saver 624 causes receiver 122 to either activate or conserve power.

Figure 20:
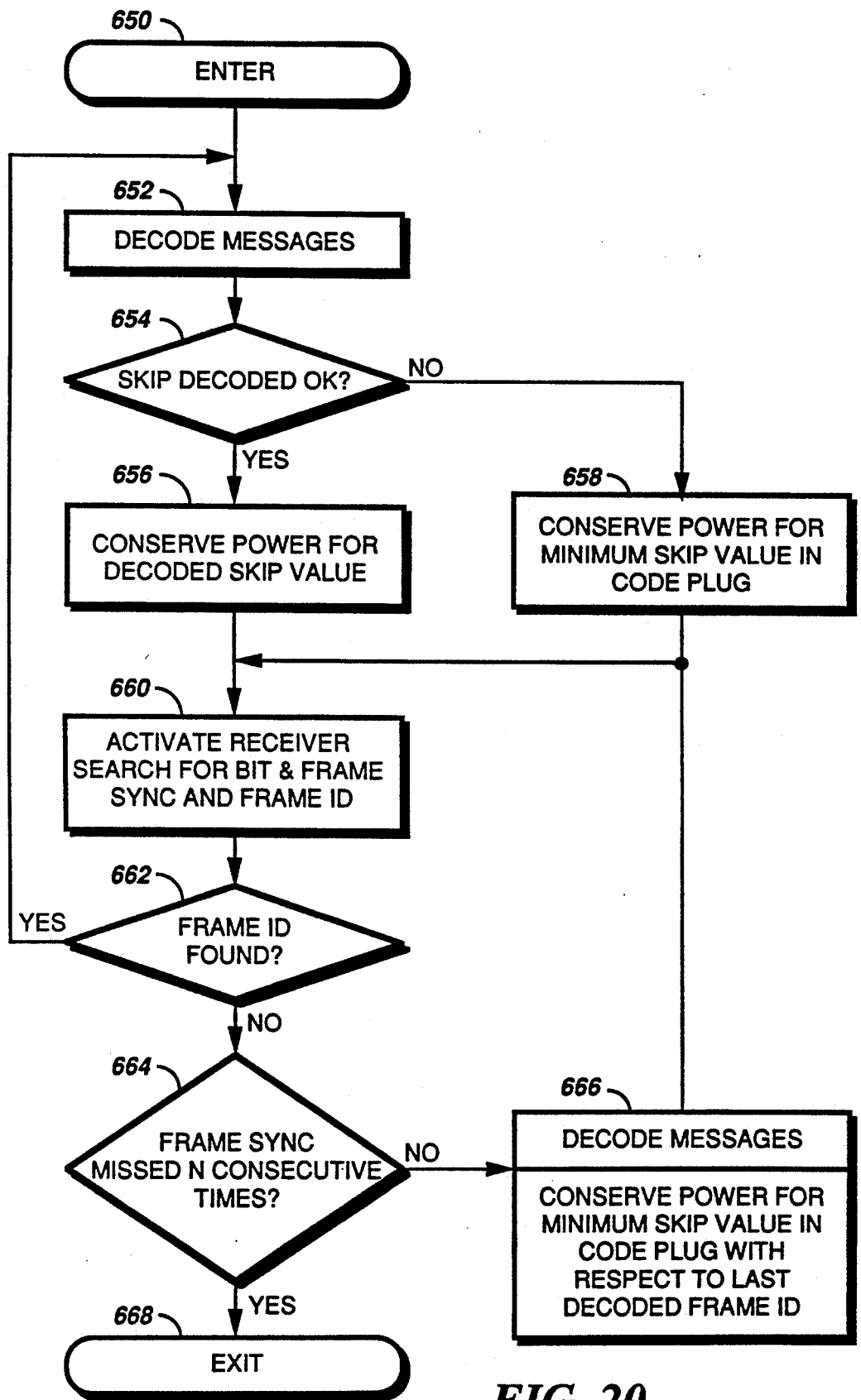
FIG. 20 is a flow diagram illustrating the synchronous operation of the selective call receiver according to FIG. 19.

Referring to FIG. 20, a flow diagram is shown illustrating the synchronous operation of the embodiment of a receiver shown in FIG. 19. Subsequent to finding a frame ID matching the predetermined frame ID within the selective call receiver code plug, the operation proceeds to enter the flow diagram at step 650. Step 652 decodes the messages in the frame and additionally, decodes the "skip" value. Step 654 determines if the "skip" value was decoded OK in step 652 (this portion of the transmission may have been disrupted by noise). If yes, step 656 conserves power for the number of frames indicated by the "skip" value. If no, power is conserved for the minimum "skip" value stored in the code plug. Responsive to either step 656 or 658, step 660 activates the receiver and searches for bit and frame synchronization and frame ID. If a frame ID is found matching the predetermined frame ID in step 662, the flow returns to step 652 to continue to decode messages. However, if the frame ID is not found, step 664 determines if frame sync has been missed for a predetermined consecutive number N of times. If not, the selective call receiver is still synchronized and step 666 causes the messages in the frame to be decoded (as in step 652) and power is conserved for the minimum "skip" value. Thus, the next frame in which decoding is to be performed is determined with respect to the last occurrence of a frame having the frame ID matching the predetermined frame ID of the decoder. Subsequently, the flow returns to step 660. However, if (step 664) frame synchronization has been missed for N consecutive times, the flow exits (step 668) to step 174 of FIG. 13 to reacquire synchronization. Thus, in response to the "skip" value, a selective call receiver may conserve power for any number of frames. Additionally, if the pager is decoding in a frame wherein the frame ID is not found, the selective call receiver may decode at frame intervals corresponding to the minimum "skip" value. In practice, the "skip" and minimum "skip" values should be related in such way that a selective call receiver having found at least a first frame with the frame ID of the selective call receiver, the selective call receiver utilizing only the minimum "skip" values will always decode in a frame having the frame ID of the selective call receiver.

Figure 21:
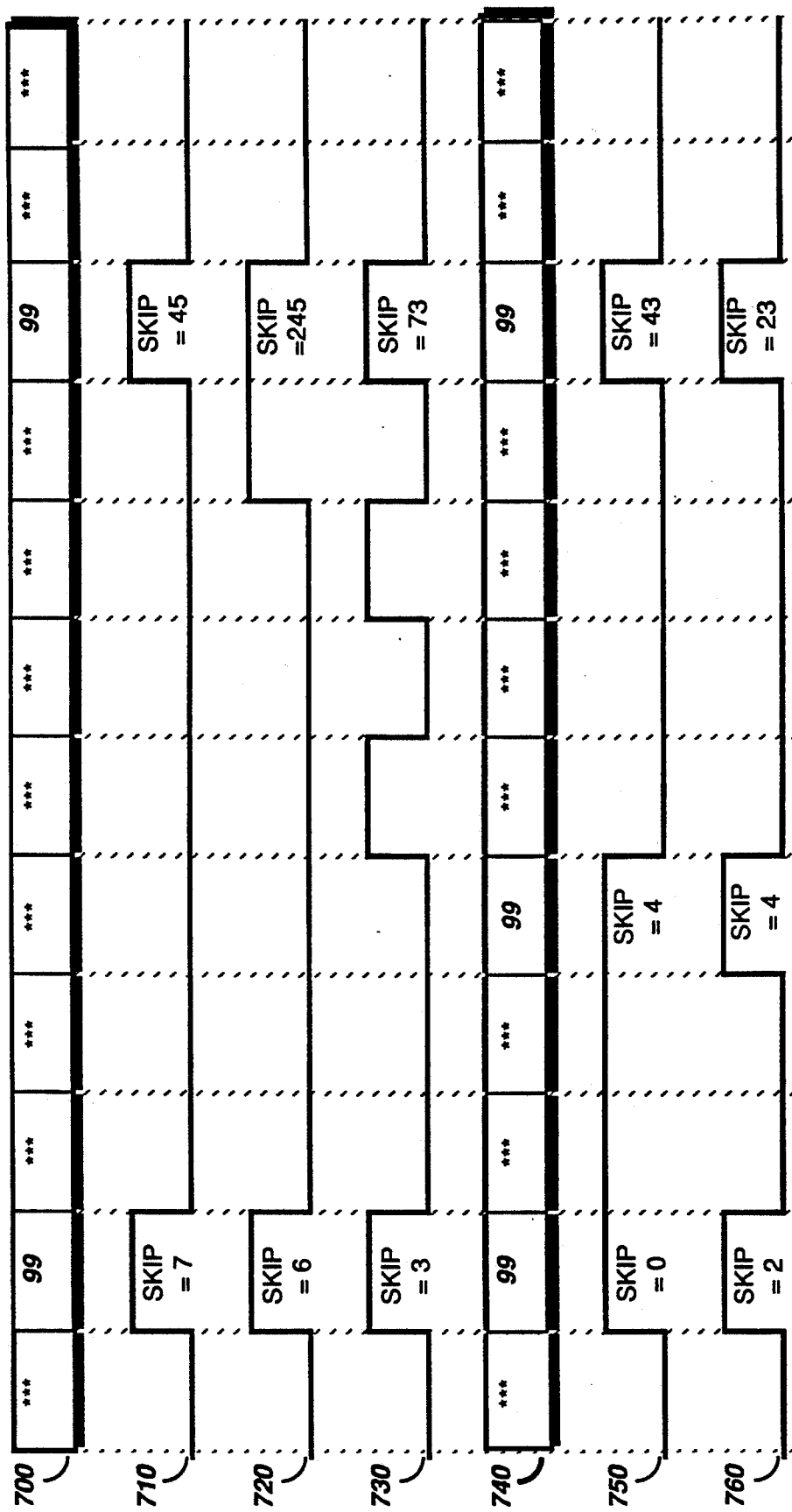
FIG. 21 is a timing diagram showing of a synchronous selective call receiver signal and the battery saver operation according to the selective call receiver of FIG. 19.

FIG. 21 shows an example of a synchronous paging signal and the battery saver operation of the selective call receiver of FIG. 19. In this example, the selective call receiver has a predetermined frame ID of 99. Lines 700 and 740 shows that the frame ID 99 may occur at a multitude of positions. Line 700 shows the frame ID of 99 occurring eight frames apart, while line 740 shows the frame ID of 99 occurring three and five frames apart. The frame IDs of the intervening frames of lines 700 and 740 are shown as "***" and are not relevant because the selective call receiver only recognizes the frame ID of 99. Lines 710-730 and 750-760 show the power conservation and receiving and processing strobe of the selective call receiver. A logic high indicates frames where the selective call receiver is receiving and processing information and a logic low indicates frames where the selective call receiver is conserving power.

Line 710 shows a selective call receiver which, from a previous "skip" value, has been directed to decode in coincidence with the occurrence of the first frame 99. This frame has a "skip" value of 7 which causes the selective call receiver to conserve power for seven frames and begin decoding thereafter, which is in coincidence with the second occurrence of frame ID 99 of line 700. During the second occurrence of frame ID 99, the selective call receiver receives a new skip value of 45, which causes the selective call receiver to conserve power for 45 frames subsequent.

Line 720 shows a selective call receiver which, from a previous "skip" value, has been directed to decode in coincidence with the occurrence of the first frame 99. The selective call receiver, (line 720) has a predetermined minimum "skip" value of "0". A decoded "skip" value of 6 causes the selective call receiver to conserve power for 6 frames. Upon activating, the selective call receiver does not recognize the frame ID of the seventh frame but decodes information in that frame. The subsequent frame contains the ID of 99 and a "skip" value of 245, and the selective call receiver decodes the frame and conserves power for 245 frames. Thus, by providing a "skip" value less than the occurrence of the next frame ID for the selective call receiver, the selective call receiver can be made to decode in additional frames. Upon finding the frame ID of the selective call receiver, additional power conservation is performed.

Line 730 shows the operation of a selective call receiver having a minimum skip value of 1. Subsequent to a decoded first frame having an ID of 99, the selective call receiver receives a "skip" value of 3 and conserves power for 3 frames. The information in the fourth frame is decoded, however, if a frame ID of 99 is not found, the selective call receiver decodes the fourth frame and conserves power for the minimum skip value of 1 and then decodes the sixth frame. This frame also does not have a frame ID of 99 and power is again conserved for the minimum skip value of 1 frame. The selective call receiver then decodes the eight frame wherein the frame ID of 99 is found and a skip value of 73 is decoded. After decoding the frame, the selective call receiver conserves power for the subsequent 73 frames. Thus, a selective call receiver with a minimum "skip" value of 1 decodes every other frame until a frame having the frame ID of the selective call receiver is found.

Line 750 shows a method for decoding the signal of line 740. Upon decoding the first frame of line 740 having an ID of 99 and a "skip" value of 0, the selective call receiver decodes in every subsequent frame until a frame having an ID of 99 is found. Three frames later, frame ID 99 and a "skip" value of 4 is found. Thus, the selective call receiver has decoded in four consecutive frames. In response to a "skip" value of 4 the selective call receiver conserves power for four frames wherein it reactivates, decodes the frame and responds to a new "skip" value of 43. Line 760 shows another example of a signal as in 740 wherein every "skip" value corresponds to the occurrence of frames having a frame ID of 99.

Figure 22:
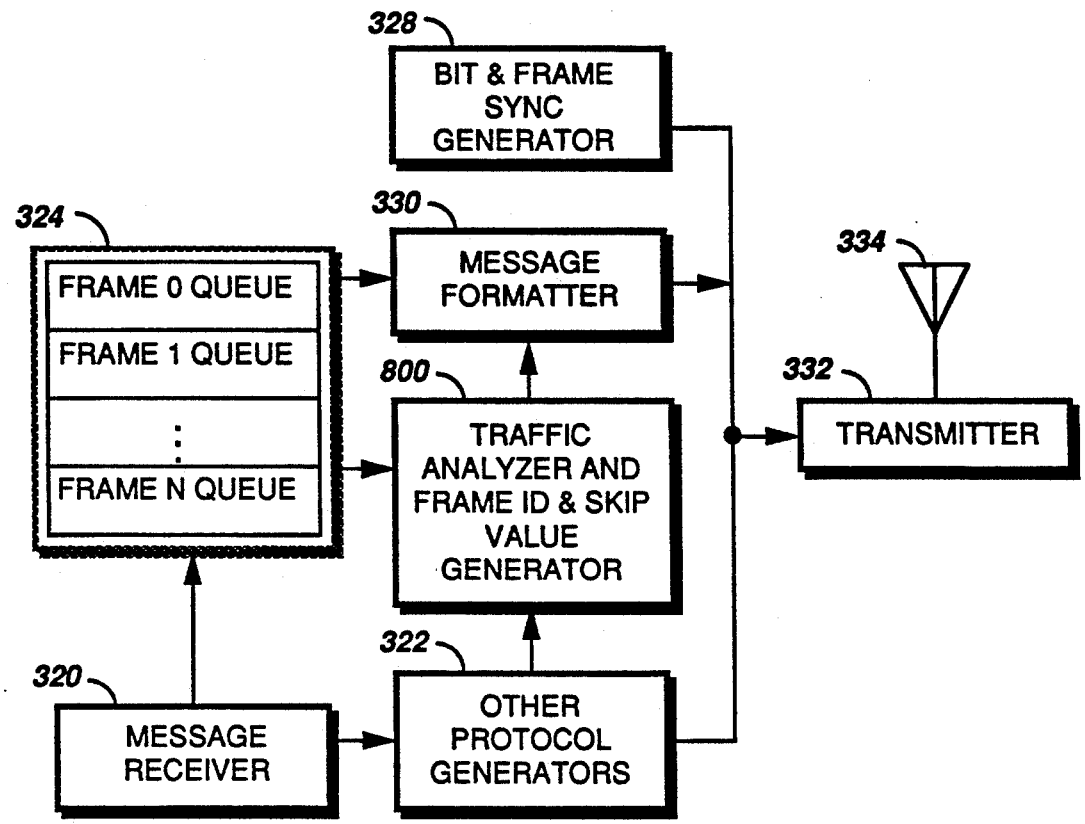
FIG. 22 is a block diagram of a selective call receiver terminal generating a paging signal in accordance with FIG. 18.

FIG. 22 shows a block diagram of a paging terminal generating a paging signal in accordance with FIG. 18. The functions of the paging terminal are substantially identical to the functions described with respect to FIG. 8 having identification numbers corresponding thereto. The difference being traffic analyzer and frame ID and skip value generator function 800. This function generates frame IDs and determines the "skip" values to be included within a frame in response to the traffic conditions of the frame. As in the capacity analyzer 326 of FIG. 8, block 800 is also responsive to other protocols being transmitted.

Figure 23:
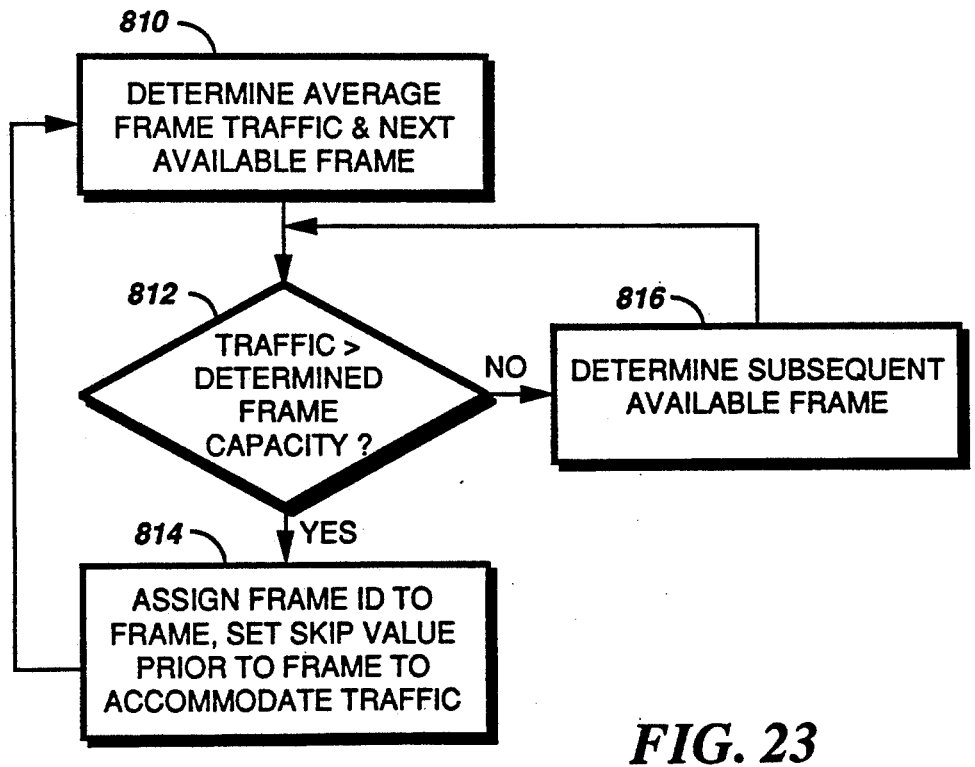
FIG. 23 is a flow diagram illustrating the operation of the traffic analyzer and interval and repetition generator.

FIG. 23 is a flow diagram illustrating the operation of the traffic analyzer and interval and repetition generator. When a frame ID is being transmitted, step 810 determines the average frame traffic and the next available frame having a vacant frame ID. Then step 812 determines if the amount of traffic is greater than the traffic provided for by the next vacant frame. If not, step 816 determines the subsequent available frame having a vacant frame ID, and returns to step 812. This sequence continues until the step 812 is satisfied. Then in step 814, the frame ID is assigned to the last determined frame. A "skip" value is set to either correspond to or be less than the occurrence of the of the determined frame in order that the extra frames may accommodate traffic sufficient to change the equality of step 812.

In alternate embodiments, frames IDs may be assigned additionally in response to a minimum and/or maximum number of frames between frame IDs associated with each frame ID. Additionally, the assigned frame must provide for any minimum predetermined "skip" value associated to the selective call receivers having that predetermined frame ID.

Thus, signals corresponding to three embodiments of the present invention have been shown. FIG. 1 shows a signal which has a predetermined number of frame IDs numbered in a predetermined sequence. FIG. 11 shows a signal in which any number of frame IDs may be used in any sequence, however, the period of each frame ID is constant. FIG. 18 shows a signal in which any number of frame IDs may be used in any sequence. It should be appreciated that the repetition value may be used with any of the signals as described if FIG. 11, or be entirely eliminated. Additionally, with some minor modifications to the signal of FIG. 1, all three signals may be combined, thereby providing an extremely flexible paging system. Since selective call receivers receiving signals of FIGS. 1, 11 and 18 need not decode frame IDs and cycle, interval, period or "skip" values in every frame in which messages are decoded, and since the bit sync 102, frame sync 104 and message signals 110 have the same messages, messages within frames having frame IDs of one embodiment may be properly decoded by selective call receivers operating in accordance with another embodiment of the invention. In order to provide for an efficiently operating paging system, means for frame assignment of one, two or all three of the embodiments should be provided.

Figure 24:
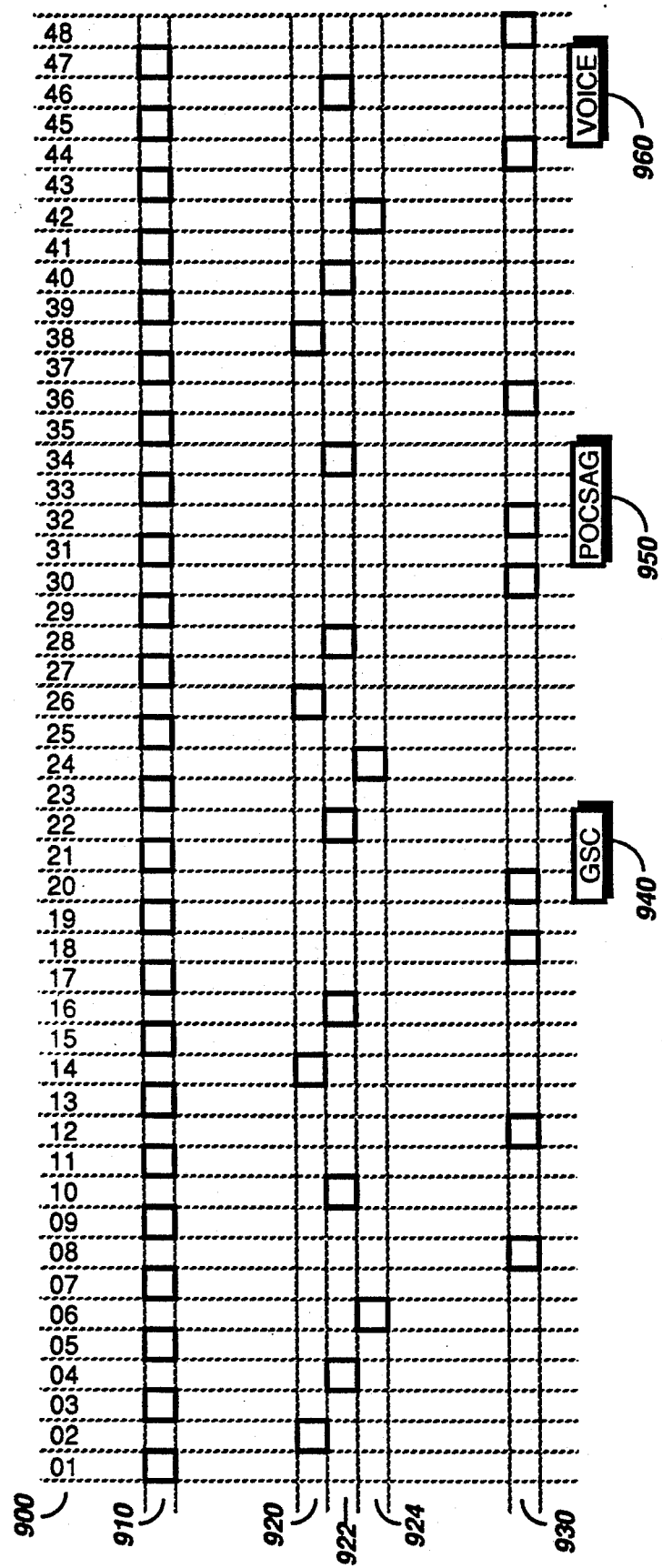
FIG. 24 is a timing diagram showing an example of the frame assignments for the combined signals of FIGS. 1, 11, and 18 and signals of other paging protocols.

FIG. 24 shows an example of a frame assignment that combines signals of FIGS. 1, 11 and 18 and signals from other paging protocols. Line 900 shows frames numbered 1 through 48, each frame having a common bit sync, frame sync and message information structure signals. Line 910 shows frames with frame IDs assigned according to FIG. 1. This embodiment of the invention has been modified such that every other frame is assigned a frame ID in accordance with FIG. 1. The frames are preferably numbered in even increments between values of 1 and 63, and the cycle values are selected such that the selective call receivers only decode in odd numbered frames. Thus, the remaining frame IDs are placed in the even numbered frames. It should be further appreciated that using this modification, frame IDs operation in accordance with FIG. 1 may alternately be used every 4th, 8th, . . . , $2^N$th frames, thereby providing for more frames to be used by the other embodiments. Selective call receivers receiving the frames of line 910 operate according to the dictates of the cycle value received in the frames.

Lines 920, 922 and 924 show frames with frame IDs operating in accordance with the signal of FIG. 11. Line 920 shows a frame ID which has a period 12 frames, line 922 shows a frame ID which has a period of 6 frames and line 924 shows a frame ID having a period of 18. Selective call receivers decoding in frames of either lines 920, 922 or 924 operate in accordance with the interval and repetition signals contained therein.

Line 930 shows remaining frames which are available for use with frame IDs used in accordance with the signal of FIG. 18. Any number of frame IDs may be used on the frames of line 930, each frame ID including a skip value causes the selective call receivers to conserve power according with the selective call receiver of FIG. 19. The frame IDs of the frames on lines 920-930 are preferably different from those of line 910 such that they are not recognized by the selective call receivers decoding the signal of FIG. 1.

For example, the period of the frame ID of line 920 is 12, and if the interval in frame 2 of line 900 is 3, the group of selective call receivers having the frame ID of line 12 would also decode in frame numbers 6 and 10. The frame ID of these frames belong to selective call receivers of lines 922 and 924, respectively. If, in another example, the interval in frame 2 of line 900 is 4, the group of selective call receivers having the frame ID of line 12 would also decode in frame numbers 5, 8 and 11, respectively. Thus, frame IDs of frames 5 and 11 are assigned to the selective call receivers of line 910, while the frame ID of frame 8 is assigned to the selective call receivers of line 930. Therefore, in this example, the selective call receivers, of the embodiment corresponding to FIG. 11, decode message information in frames operating in correspondence with the embodiments of FIGS. 1 and 18.

Items 940, 950 and 960 illustrate that other signalling protocols may coexist with this embodiments of the present invention. Preferably, each frame is substantially 4 seconds in duration. Item 940 shows that a GSC signal is transmitted in place of frames indicated by 21, 22 and 23 on line 900. The GSC signal may be either data messages or voice messages. The GSC signal occupying these positions makes decoding of frame IDs and information by selective call receivers of the invention impossible. Since selective call receivers of the invention have a predetermined response to the absence of frame IDs, the subsequent frames in which they decode my be predicted. Thus, selective call receivers operating in accordance with line 910 having missed a frame ID in frame indicated by 21 will find a proper frame ID in the frame indicated by 23. These selective call receivers will respond according to the previous cycle value in the other frames of line 910. Additionally, selective call receivers operating in accordance with line 922, which missed a frame ID in the frame indicated by 22, will find a proper frame ID in the frame indicated by 28. Accordingly, the response of the group of selective call receivers in the intervening frames are predictable based on the predetermined interval and repetition values assigned to the group of selective call receivers, allowing the messages for the selective call receivers to be placed in the intervening frames.

Furthermore, selective call receivers operating in accordance with line 930 which are programmed to expect a frame ID in frame 20, will miss the frame ID and, will decode in accordance with the minimum skip value assigned to that group of selective call receivers. If the minimum skip was 0, these selective call receivers will decode in every subsequent frame until a frame ID matching their predetermined frame ID is found. Thus, messages for these selective call receivers may be placed in any frame after frame 22. Battery saving operation of these selective call receivers may be restored by "forcing" a frame having their frame ID in another frame, for example frame identified by number 26, thereby giving these selective call receivers a new skip value. Since the frame identified by 26 was apriori assigned to selective call receivers of line 920, the selective call receivers of line 920 will miss their expected frame ID at frame 26, causing these selective call receivers to decoded according to their predetermined interval and repetition values until the occurrence of frame identified by 38. Thus, the response of the selective call receivers of the invention to the GSC message is predictable, and synchronization to the signal is maintained. Accordingly, similar example responses to the POCSAG signal 950 and the analog voice signal 690 may be made. In this way, this invention facilitates the additions of other signalling systems by temporarily frustrating the battery saving features of the selective call receivers.

It should be appreciated that since selective call receivers of all three embodiments continue to decode in a known manner if an expected frame ID and or cycle value is not found. This provides for the transmission of another protocol such as the POCSAG or GSC paging protocol, while the selective call receivers remain in synchronization. Furthermore, this aspect provides for forcing the frame ID of a first frame of selective call receivers in the expected frame of another group of selective call receivers location to recover the battery save feature of the first group of selective call receivers.

Furthermore, the similarity in the paging terminals of FIGS. 8, 16 and 22 enable the combination of different functions. A frame queue 324 may hold the queues of the frames of all three embodiments to facilitate the combination. Accordingly, a frame which may have selective call receivers of one, two or all three embodiments may be analyzed by the capacity analyzer of each embodiment for total frame capacity. The selective call receivers of FIGS. 2, 12 and 19 operate substantially identically with the exception of the response to the received frame ID, cycle, interval and repetition, or skip value. Thus, a method for decoding any of the three embodiments may be incorporated into every selective call receiver, and an additional signal stored in the code plug of the selective call receiver to indicate the embodiment of the invention the selective call receiver.

Although several embodiments of the invention have been described by way of example, other modifications may be made to the description herein, while remaining within the spirit of the present invention.

We claim:
1. A selective call receiver comprising:
   a memory having a first mask stored therein indicative of a first period of reception for receiving a transmitted communication signal having a plurality of packets, each packet having:
   message information; and
   a control signal representative of a second mask which is indicative of a second period of reception, said selective call receiver comprising:
   identifier means for identifying packets;
   means for receiving the control signal;
   comparing means for comparing the first mask and the second mask for establishing a correspondence therebetween;
   battery saving means responsive to the comparing means and the identifier means for changing the first period of reception to the second period of reception of said selective call receiver for receiving an at least one additional packet.

2. The selective call receiver according to claim 1 wherein the battery saving means comprises a detecting means for detecting whether the second period of reception is more frequent than the first period of reception.

3. The selective call receiver according to claim 2 wherein the battery saving means further includes a changing means for changing the first period of reception of said selective call receiver to the second period of reception when the second period of reception is more frequent than the first period of reception.

4. The selective call receiver according to claim 3 wherein said changing means maintains the first period of reception when the second period of reception is less frequent than the first period of reception.

5. The selective call receiver according to claim 1 wherein the identifier means identifies the packet from an identification signal contained within the packet.

6. The selective call receiver according to claim 1 wherein the identifier means identifies the packet from a time position associated with the packet.

7. In a selective call receiver, a method for receiving a transmitted communication signal, comprising the steps of:
   using predetermined signals assigned to the selective call receiver representative of a first mask indicative of a first period of reception for receiving the transmitted communication signal having a plurality of packets, each packet comprising:
   message information; and
   a control signal representative of a second mask indicative of a second period of reception for enabling the selective call receiver to receive at least one additional packet, said method further comprising the steps of:
identifying the packet;
receiving the control signal;
comparing the first mask with the second mask;
establishing, in response to the step of comparing, a correspondence between the first mask and second mask;
changing the first period of reception of said selective call receiver to the second period of reception for receiving an at least one additional packet.

8. The method according to claim 7 wherein said step of receiving further includes the steps of:
analyzing the message information within the received packet; and
generating an alert signal in response to a detection of a message having an address signal corresponding to a predetermined address signal assigned to the selective call receiver.

9. The method according to claim 7 wherein the step of identifying identifies the packets occurring in a predetermined sequence, and a step of determining for determining the occurrence of additional packets as a function of a time position of the packets.

10. The method according to claim 7 wherein the step of identifying identifies a predetermined number of packet identifiers corresponding to a value of $2^N$, and the control signal corresponding to a N bit value.

11. The method according to claim 10 wherein the step of determining further determines the second period of reception for receiving the additional packet having a portion of the packet identifier corresponding to an unmasked portion.

12. The method according to claim 9 wherein the predetermined sequence of packet identifiers corresponds to a value of $2^N$, and the control signal indicates one of a plurality of predetermined second masks having N bits and said step of determining further comprises the steps of:
determining the one of the predetermined N bit second masks in response to the control signal;
masking the first mask with the one of the predetermined second masks to produce an unmasked portion; and
determining whether to change the period of reception for receiving an additional packet having a portion of the packet identifier corresponding to the unmasked portion.

13. The method according to claim 7 wherein said step of establishing establishes the correspondence between first mask and the second mask which determines if the first period of reception of said selective call receiver is less frequent than the second period of reception for receiving the additional packet.

14. The method according to claim 13 wherein the correspondence between the first and second masks determines the change from the first period of reception for establishing the second period of reception.

15. The method according to claim 14 further comprising the steps of:
receiving the communication signal during the occurrence of the at least one additional packet;
establishing the correspondence of the first and second masks;
determining in response to said correspondence, the occurrence of the other of the at least one additional packet from the established period of reception of a prior received packet to the period of reception for the at least one additional packet, the prior received packet having a mask indicative of a third period of reception; and
changing the period of reception of the communication signal between the occurrences of one of the at least one additional packet and the other of the at least one additional packet.

16. The method according to claim 15 wherein the first and second masks determine a value indicative of the number of packets until the occurrence of the additional packet.

17. The method according to claim 16 wherein the determined value is less than a default number of packets then said method further comprises the step of changing the period of reception of the communication signal between the occurrences of one of the at least one additional packet and the other of the at least one additional packet.

18. A selective call receiver system comprising:
transmitting means for transmitting a communication signal to a plurality of selective call receiver groups, said plurality of selective call receiver groups having a first mask stored within the selective call receivers indicative of a first period of reception for receiving the transmitted communication signal having a plurality of packets;
means for periodically generating packets, the packet having:
message information, and
a control signal representative of a second mask indicative of a second period of reception for enabling the at least one of the plurality of the selective call receiver groups to receive an at least one additional packet;
means for identifying at least one of the plurality of groups of selective call receivers,
means for accumulating a plurality of messages;
means for determining the occurrence of the at least one additional packet capable of having message information;
means for generating the control signal with the second mask indicative of the second period of reception in response to said determination; and
means for incorporating the control signal within the packet to be transmitted to the at least one group of selective call receivers.

19. A method of transmitting a signal to a plurality of selective call receiver groups, each selective call receiver having a first mask indicative of a first period of reception of said selective call receiver groups, the method comprising the steps of:
periodically generating packets, each packet having:
message information, and
a control signal representative of a second mask which is indicative of a second period of reception;
identifying at least one of the group of selective call receivers,
accumulating a plurality of messages;
determining the transmission of an at least one additional packet capable of having message information;
generating the control signal having the second mask indicative of the second period of reception in response to said determination;
incorporating the control signal within the packet; and
transmitting the packet.

20. The method according to claim 19 wherein the control signal corresponds to the number of periods of the periodically generated packets between a packet identifier assigned to the first group of selective call receivers and the occurrence of a subsequent packet potentially having message information for the first group of selective call receivers.

21. The method according to claim 19 wherein said step of determining determines in response to the first mask whether the first period of reception of the selective call receiver is less frequent than the second period of reception.

22. The method according to claim 19 further comprising the steps of:
incorporating message information for the first group of selective call receivers into the at least one additional packets;
incorporating the packet identifier wherein a second group of selective call receivers exclusive of the first group of selective call receivers responds to the packet identifier for identifying the additional packet having a control signal for changing the period of reception; and
transmitting the at least one additional packet.

23. The method according to claim 19 wherein said step of determining determines the occurrence of the at least one additional packet to be less than or equal to a predetermined number; and
said step of generating generates the control signal for changing the period of reception of the at least one group of selective call receivers.

24. The method according to claim 23 wherein said step of determining determines the occurrence of the at least one additional packet to be greater than or equal to a current interval; and
said step of generating generates the control signal for changing the period of reception of the at least one group of selective call receivers for restoring the first period of reception.

* * * * *